United States Patent

Tyan et al.

[11] Patent Number: 5,893,127
[45] Date of Patent: Apr. 6, 1999

[54] GENERATOR FOR DOCUMENT WITH HTML TAGGED TABLE HAVING DATA ELEMENTS WHICH PRESERVE LAYOUT RELATIONSHIPS OF INFORMATION IN BITMAP IMAGE OF ORIGINAL DOCUMENT

[75] Inventors: Ching-Yu Tyan, Irvine; Hung Khei Huang, Lake Forest; Toru Niki, Irvine, all of Calif.

[73] Assignee: Canon Information Systems, Inc., Irvine, Calif.

[21] Appl. No.: 751,676

[22] Filed: Nov. 18, 1996

[51] Int. Cl.⁶ ................................................ G06F 17/00
[52] U.S. Cl. .................... 707/513; 707/509; 707/518; 382/176
[58] Field of Search ................ 395/774, 762, 395/779, 780, 781, 785, 788; 382/176, 173, 175, 180; 707/513, 518, 509

[56] References Cited

U.S. PATENT DOCUMENTS

| | | | |
|---|---|---|---|
| 4,933,984 | 6/1990 | Nakano et al. | 382/175 |
| 5,048,107 | 9/1991 | Tachikawa | 382/173 |
| 5,065,442 | 11/1991 | Kugai | 382/179 |
| 5,073,953 | 12/1991 | Westdijk | 382/176 |
| 5,075,895 | 12/1991 | Bessho | 382/175 |
| 5,086,346 | 2/1992 | Fujisawa | 358/453 |
| 5,093,868 | 3/1992 | Tanaka et al. | 382/177 |
| 5,101,439 | 3/1992 | Kiang | 382/174 |
| 5,101,448 | 3/1992 | Kawachiya et al. | 382/287 |
| 5,129,012 | 7/1992 | Abe | 382/190 |
| 5,172,422 | 12/1992 | Tan | 382/174 |
| 5,278,918 | 1/1994 | Bernzott et al. | 382/176 |
| 5,278,920 | 1/1994 | Bernzott et al. | 382/176 |
| 5,307,422 | 4/1994 | Wang | 382/177 |
| 5,313,526 | 5/1994 | Cheong | 382/176 |
| 5,335,290 | 8/1994 | Cullen et al. | 382/176 |
| 5,351,314 | 9/1994 | Vaezi | 382/264 |
| 5,359,673 | 10/1994 | De La Beaujardiere | 382/229 |
| 5,430,808 | 7/1995 | Baird et al. | 382/176 |
| 5,436,983 | 7/1995 | Bernzott et al. | 382/229 |
| 5,465,304 | 11/1995 | Cullen et al. | 382/176 |
| 5,486,686 | 1/1996 | Zdybel, Jr. et al. | 235/375 |
| 5,530,852 | 6/1996 | Meske, Jr. et al. | 395/200.36 |
| 5,555,362 | 9/1996 | Yamashita et al. | 707/517 |
| 5,557,722 | 9/1996 | DeRose et al. | 395/774 |
| 5,587,902 | 12/1996 | Kugimiya | 395/752 |
| 5,588,072 | 12/1996 | Wang | 382/176 |
| 5,594,809 | 1/1997 | Kopec et al. | 382/161 |

FOREIGN PATENT DOCUMENTS

| | | |
|---|---|---|
| 0325417 | 7/1989 | European Pat. Off. . |
| 496531 | 7/1992 | European Pat. Off. . |

(List continued on next page.)

OTHER PUBLICATIONS

Powell, "A document scanning duo with real character", *Window Magazine*, v. 7, n. 7, p. 107(2), Jul. 1996.

(List continued on next page.)

*Primary Examiner*—Joseph R. Burwell
*Attorney, Agent, or Firm*—Fitzpatrick, Cella, Harper & Scinto

[57] ABSTRACT

Automatic generation of hypertext markup language (HTML) files based on bitmap image data, which faithfully preserves layout information of an original document from which the bitmap data was obtained. Generally, multi-column document layouts result in automatic generation of HTML files that use HTML "table tags" to display each of the different columns. More particularly, a bitmap image is obtained such as by scanning or retrieval of a pre-existing image, and the bitmap image is segmented into blocks. The location of each block is determined, each block is analyzed in preparation for insertion of appropriate data into an HTML file, and layout analysis is performed to identify layout relationships between the blocks based on the relative locations of the blocks in the bitmap image. Based on the layout relationships, a block type is determined for each block, column span and row span data for each block is determined, blocks are re-ordered if needed, and an HTML file is generated in which blocks are tagged as data elements in a row of an HTML "table tag" based on block type and based on column and row span information for the block.

66 Claims, 22 Drawing Sheets

FOREIGN PATENT DOCUMENTS

| | | |
|---|---|---|
| 0660 256 A2 | 12/1994 | European Pat. Off. . |
| 0758 775 A2 | 8/1996 | European Pat. Off. . |
| 63-116569 | 5/1988 | Japan . |
| 490083 | 3/1992 | Japan . |
| WO 80/02761 | 12/1980 | WIPO . |
| WO 92/06448 | 4/1992 | WIPO . |

OTHER PUBLICATIONS

Nadile, "Caere brings electronic publishing to the Internet", *PC Week*, v. 13, N. 26, p. 10, Jul. 1, 1996.

Itonori, "Table Structure Recognition based on Textblock Arrangement and Ruled Line Position", Proc. of Second Intl. Conf. on Document Analysis and Recognition, Oct. 20, 1993, pp. 765–768.

Lawrentini et al., "Identifying and Understanding Tabular Material in Compound Documents", $11^{th}$ *IAPR Intl. Conf. on Pattern Recognition*, pp. 405–409, Aug. 30, 1993.

Saitoh, "Document Image Segmentation and Text Area Ordering", Second Intl. Conf. on Document Analysis and Recognition, Oct. 20, 1993, pp. 323–329.

Hirayama, "A Block Segmentation Method for Document Images with Complicated Column Structures", Second Intl. Conf. on Document Analysis and Recognition, Oct. 20, 1993, pp. 739–742.

Okamoto et al., "A Hybrid Page Segmentation Method", Second Intl. Conf. on Document Analysis and Recognition, Oct. 20, 1993, pp. 743–746.

Gann, Roger, "Caere improves its OCR interface", PC User, Aug. 21–Sep. 3, 1996, p. 44.

Gann, Roger, "Accurate OCR for complex pages", PC User, Oct. 2–15, 1996, p. 50.

Park, Young Seak, "A hierarchical Method for block Segmentation and Classification of General Document Images", Systems and Computer in Japan, vol. 24, No. 9, 1993, pp. 84–96.

Tang, Yuan Y., et al., "Automatic Document Processing: A Survey", Pattern Recognition, vol. 29, No. 12, Dec. 1996, pp. 1931–1952.

Isao Masuda, et al., "Approach to Smart Document Reader System", Proc. of IEEE Comp. Society Conf. on Computer Vision and Pattern Recognition, Jun. 1985, pp. 550–557.

Hiroshi Makino, "Representation And Segmentation Of Document Images", Proc. of IEEE Comp. Society Conf. on Computer Vision and Pattern Recognition, Jun. 1983, pp. 291–296.

W. Doster, "A Step Towards Intelligent Document Input To Computers", et al., Proc. of IEEE Comp. Society Conf. on Computer Vision and Pattern Recognition, Jun. 1983, pp. 515–516.

Qin Luo, et al., "A Structure Recognition Method For Japanese Newspapers", Symposium on Document Analysis and Information Retrieval, Mar., 1992 pp. 217–234.

L.A. Fletcher, et al., "A Robust Algorithm For Text String Separation From Mixed Text/Graphics Images", IEEE Transactions On Pattern Analysis and Machine Intelligence, vol. 10, No. 6, Nov., 1988, pp. 910–918.

Osamu Iwaki, et al., "A Segmentation Method Based On Office Document Hierarchical Structure", Proceedings of the 1987 IEEE International Conference on Systems, Man, and Cybernetics, vol. 2, pp. 759–763.

K.Y. Wong, et al., "Document Analysis System", IBM J. Res. Develop., vol. 26, No. 6, Nov., 1982, pp. 647–656.

D.J. Ittner, "Automatic Inference of Textline Orientation", Proccedings, Second Annual Symposium on Document Analysis & Information Retrieval, Apr. 1993, pp. 123–133.

Tsujimoto, et al., "Understanding Multi–articled Documents," 10th Int'l Conf. on Pattern Recognition, IEEE, vol. 1, Jun. 16–21, 1990, pp. 551–556.

J. Fisher, et al., "A Rule–Based System For Document Image Segmentation", IEEE Proceedings of 10th International Conference on Pattern Recognition, 1990, pp. 567–572.

T. Akiyama, et al., "Automated Entry System For Printed Documents", Pattern Recognition, vol. 23, No. 11, pp. 1141–1154, 1990.

Stuart C. Hinds, et al., "A Document Skew Detection Method Using Run–Length Encoding And The Hough Transform", Proc. of 10th Intl. Conf. on Pattern Recognition, vol. 1, pp. 464–468, Jun. 1990.

Philip J. Bones, et al., "Segmentation Of Document Images", SPIE vol. 1258 Image Communications and Workstations (1990), pp. 78–88.

Yamada, et al., "Document Image Processing Based on Enhanced Border Following Algorithm", IEEE Proceedings of the 10th International Conference on Pattern Recognition, vol. 2, Jun. 21, 1990, pp. 231–236.

Mizuno, et al., "Document Recognition System With Layout Structure Generator", NEC Research And development, vol. 32, No. 3, Jul. 1991, pp. 430–437.

Pizano, et al., "A Business Form Recognition System", COMPSAC91 Proceedings, The Fifteenth Annual International Computer Software & Applications Conference, Sep. 13, 1991, pp. 626–632.

"Line Segmentation Method For Documents In European Languages", IBM Technical Disclosure Bulletin, vol. 33, No. 1B, Jun. 1990, pp. 207–210.

Cordi, V. A., "Virtual Memory Hierarchy", IBM Technical Disclosure Bulletin, vol. 21, No. 10, Mar. 1979, pp. 4001–4004.

Inagaki, et al., "Macsym: A Hierarchical Parallel Image Processing System For Event–Driven Pattern Understanding Of Documents", Pattern Recognition, vol. 17, No. 1, 1984, pp. 85–108.

Y. Tang, et al., "Document Analysis And Understanding: A Brief Survey", ICDAR, First International Conference on Document Analysis and Recognition, France, Sep. 30 –Oct. 2, 1991, pp. 17–31.

G. Nagy, et al., "A Prototype Document Image Analysis System For Technical Journals", Computer, Jul. 1992, pp. 10–22.

"Converters to and from HTML ", HTML Converters, Aug. 1, 1996 (9 pages).

Drakos, Nikos, "From text to hypertext: A post–hoc rationalisation of LaTeX2HTML", Computer Networks and ISDN Systems 27, Jan. 1994, pp. 215–224.

Methvin, David, "App Adapts Help to HTML", Windows Magazine, Jul. 1996, p. 114.

"Web Tools: Authoring and Browser Plug–ins", PC Computing Best, Aug. 1996, pp. 134 and 136.

"TextBridge Pro –Getting Started", The Document Company Xerox, Mar. 1996.

"Caere OmniPage Pro for Windows 95", Caere Corporation, Mar. 1996.

The universe from earth, and earth from the universe

SPOTLIGHT ON TECHNOLOGY

Canon is putting its technolgical capabilities to work in satellite and telescope projects that will change the way we view our world. Hideo Yokota, general manager of the SO (space optics) project in Canon's optical products operations, tells the story.

Satellite projects to reveal happenings at home

Canon's first project building equipment for use on a satellite commenced in 1990. "The device we worked on," Yokota explained, "is part of an earth observation satellite program currently in the development stages." The SO (space optics) project team handled lens development for this device, which was completed in late 1995. The satellite itself will be launched in the late 1990s by America's National Aeronautics and Space Administration (NASA).

"The device using our lens monitors several bands in the thermal infrared region of the spectrum," Yokota continued, "making it useful for measuring thermal emission properties. This data will be used to study the warming of urban areas, the locations of mineral resources, the effects and extent of desertification, the movement patterns of marine life, and conditions in oceans and the atmosphere. The lens we developed improves geometric resolution, or the density of the land area covered, to 90 meters, enabling more detailed observation than previous systems."

The SO project team has also been involved in lens development for another satellite set to monitor conditions on planet earth. This observation satellite should be launched by the end of the century by the National Space Development Agency of Japan (NASDA).

"This time," Yokota said, "we are in charge of the lens system for a device similar to that developed in our first project. The difference is that this device will monitor spectral bands in the visable and near infrared regions, the short wavelength infrared region, and the middle and thermal infrared regions. The result will be a clearer picture of what is happening on land as well as in the sea and air.

Eyes in the night

"For this lens, high performance and a large aperture were required, which is why we decided on an aspherical lens surface. Light coming into the mirror will be separated and sent, as appropriate, to one of several cameras. Through this project, it will be possible to observe vegetation and other environmental patterns."

Canon Chronicle May - June 1996

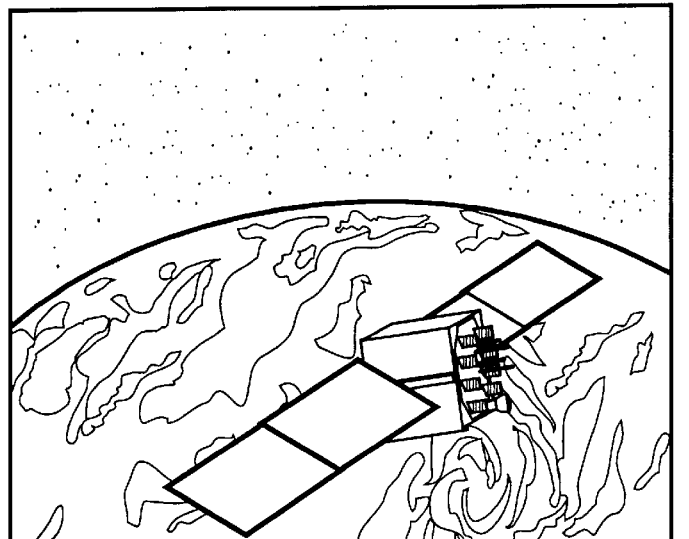

▲ Shown here is an artist's rendition of optical communications between orbital satellites. (Illustrationsupplied by National Space Cevelopment Agency of Japan)

FIG. 1

The universe from earth, and earth from theuniverse
SPOTLIGHT ON TECHNOLOGY
Canon isputting its technological capabilities to work in satellite and telescope projectsthat will change the way we view our world. Hideo Yokota, general manager of theSO (space optics) project in Canon's optical products operations, tells the story.

Satellite projects toreveal happeningsat home

Canon's first project building equipment for use on a satellite commenced in 1990. "The device weworked on," Yokota explained, "ispart of an earth observation satellite program currently in the development stages." The SO (spaceoptics) project team handled lensdevelopment for this device, whichwas completed in late 1995. The satellite itself will be launched in thelate 1990s by America's National Aeronautics and Space Administration (NASA).

"The device using our lens monitors several bands in the thermalinfrared region of the spectrum," Yokota continued, "making it useful for measuring thermal emissionproperties. This data will be used tostudy the warming of urban areas,the locations of mineral resources,the effects and extent of desertification, the movement patterns of marine life, and conditions in oceans andthe atmosphere. The lens we developed improves geometric resolution,

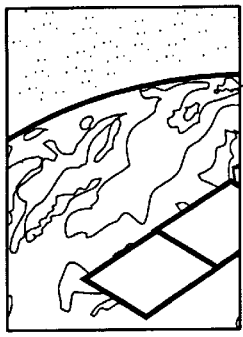

_Shown here is an artist's rendition of optical communications between orbitalsatellites. (Illustration supplied by National Space Development Agency of Japan)

or the density of the land area covered, to 90 meters, enabling moredetailed observation than previoussystems."

The SO project team has also beeninvolved in lens development foranother satellite set to monitor conditions on planet earth. This observation satellite should be launchedby the end of the century by theNational Space DevelopmentAgency of Japan (NASDA).

"This time," Yokota said, "we arein charge of the lens system for adevice similar to that developed inour first project. The difference isthat this device will monitor spectral bands in the visable and nearinfrared regions, the short wavelength infrared region, and themiddle and thermal infraredregions. The result will be a clearerpicture of what is happening on landas well as in the sea and air.

Eyes in the night

"For this lens, high performanceand a large aperture were required,which is why we decided on an aspherical lens surface. Light cominginto the mirror will be separated andsent, as appropriate, to one of severalcameras. Through this project, it willbe possible to observe vegetation andother environmental patterns."
Canon Chronicle May - J one ~ 996

FIG. 2

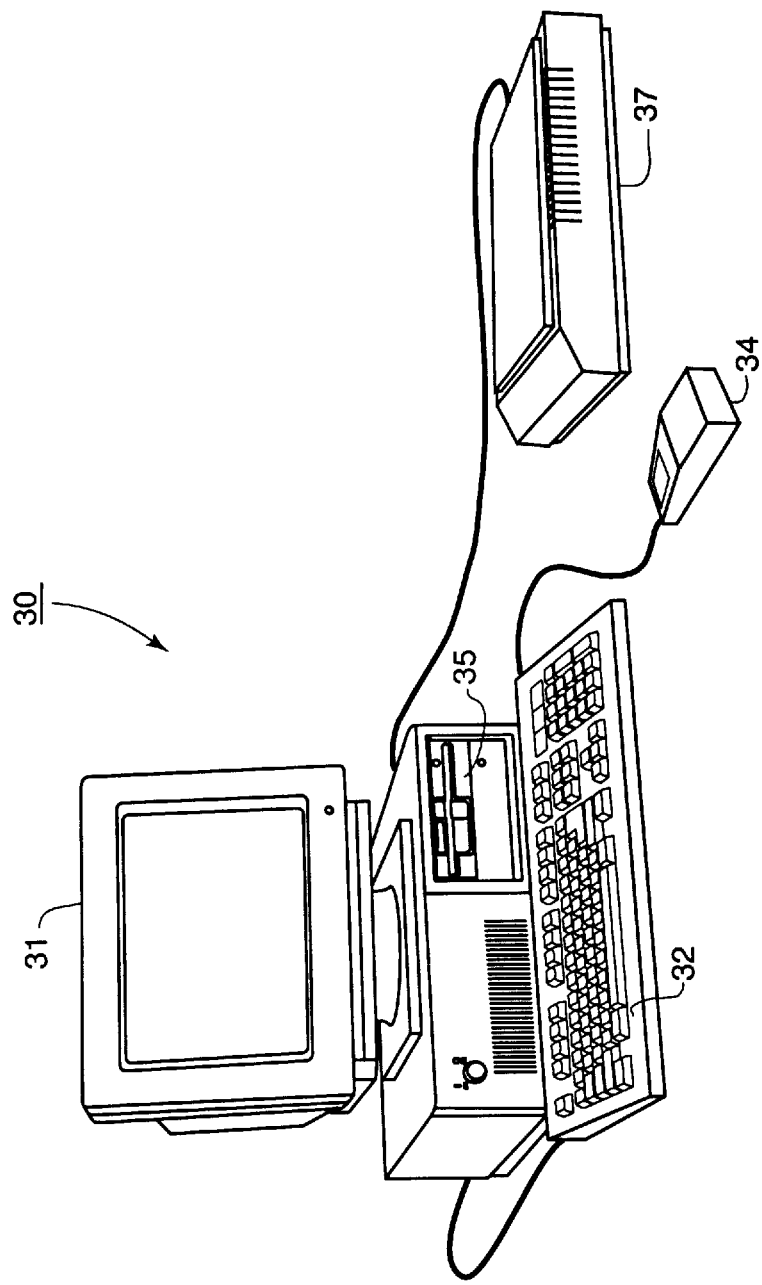

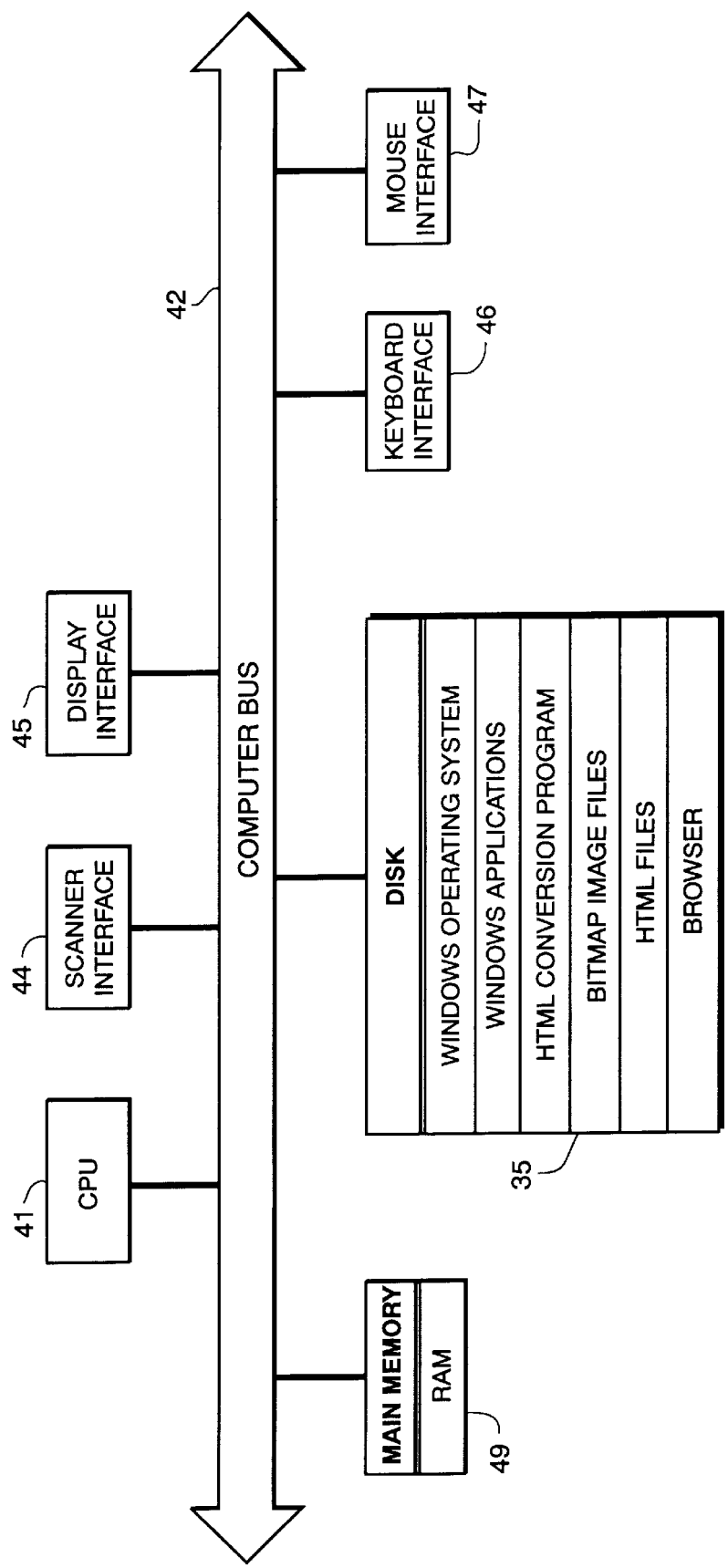

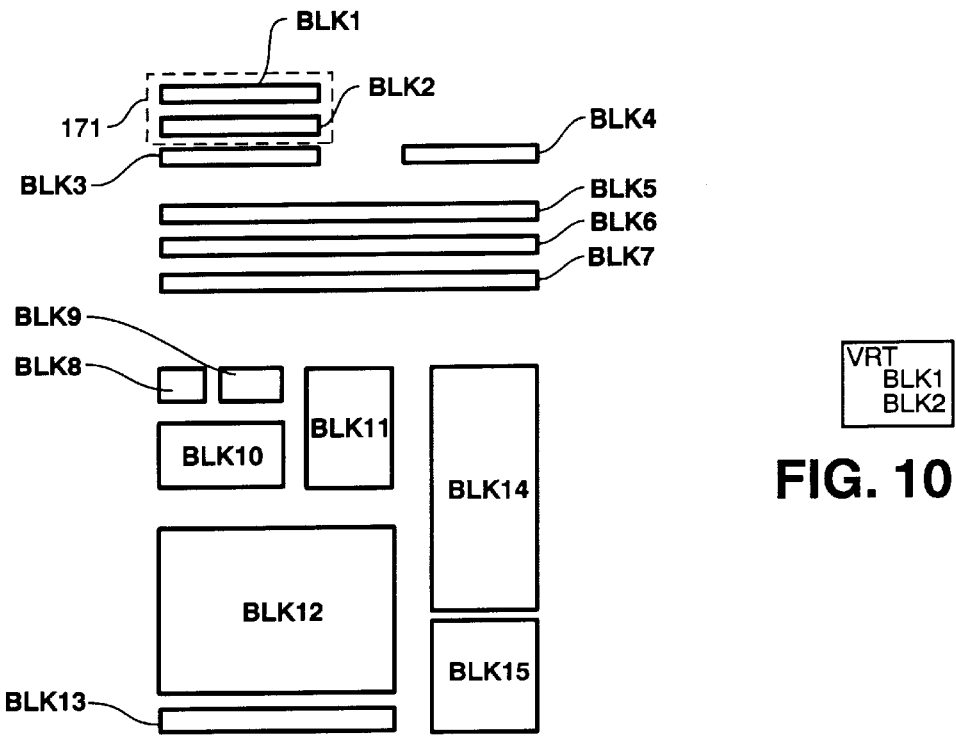
FIG. 10A-1
FIG. 10B-1
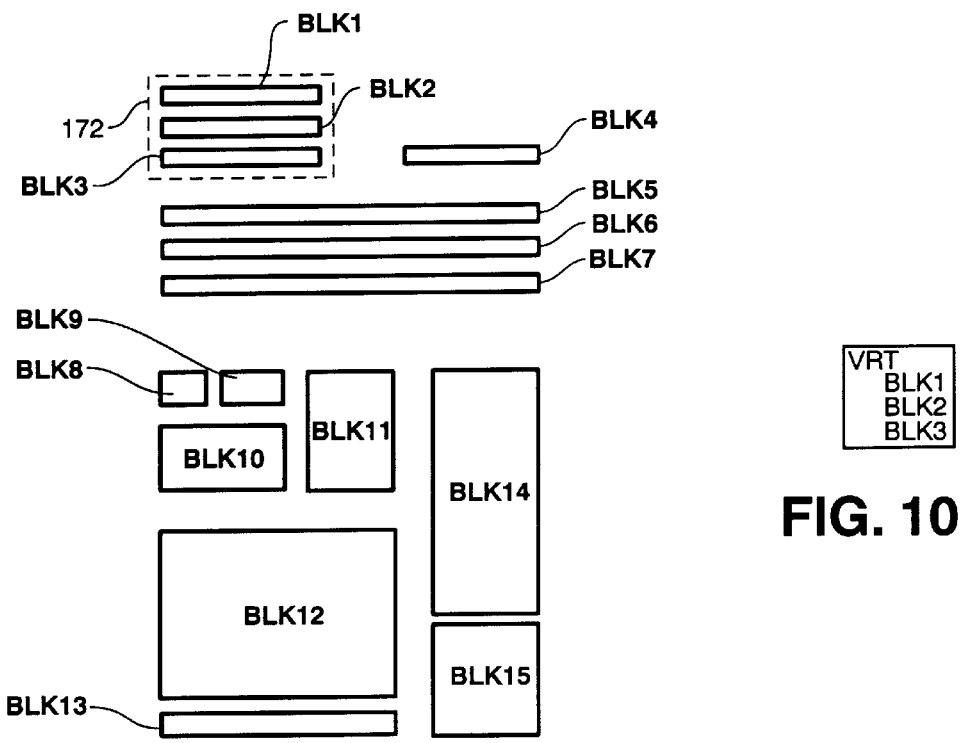
FIG. 10A-2
FIG. 10B-2

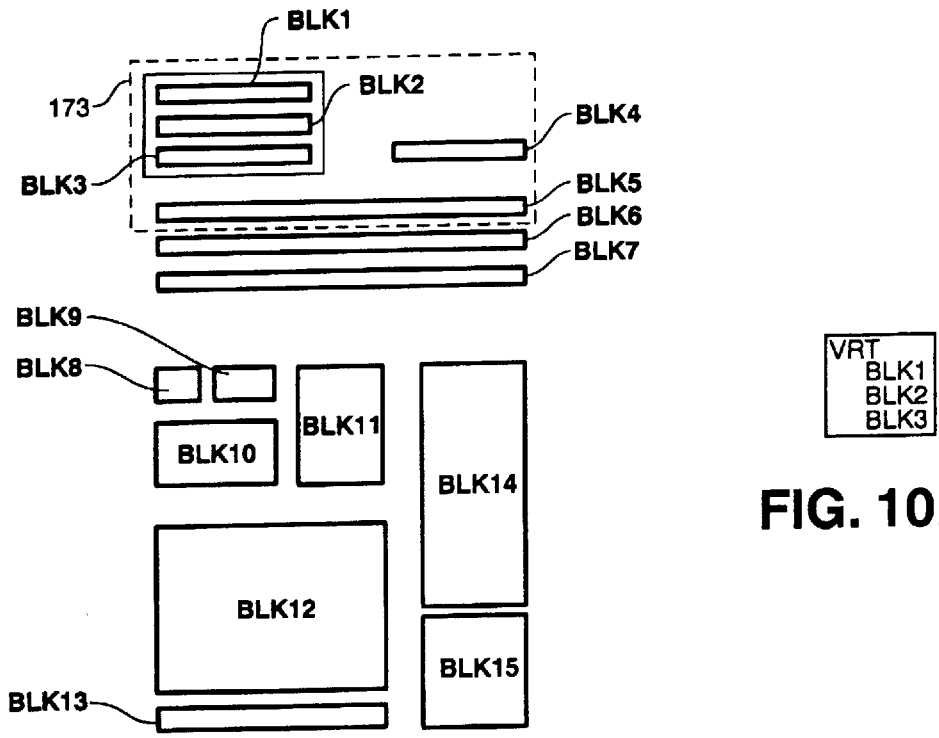
FIG. 10A-3
FIG. 10B-3
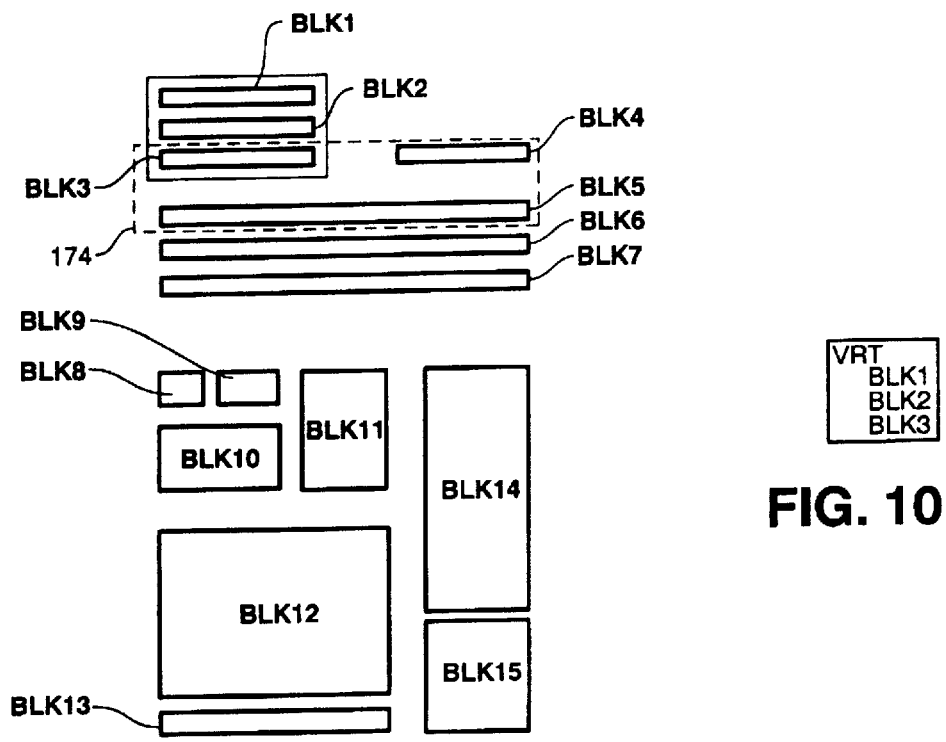
FIG. 10A-4
FIG. 10B-4

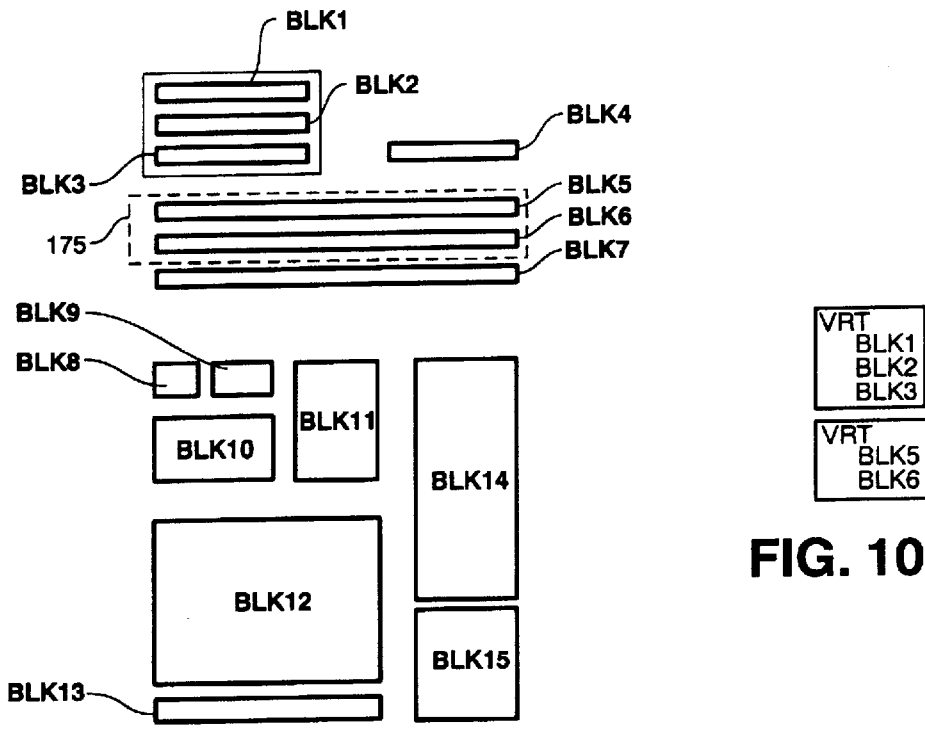
FIG. 10A-5
FIG. 10B-5
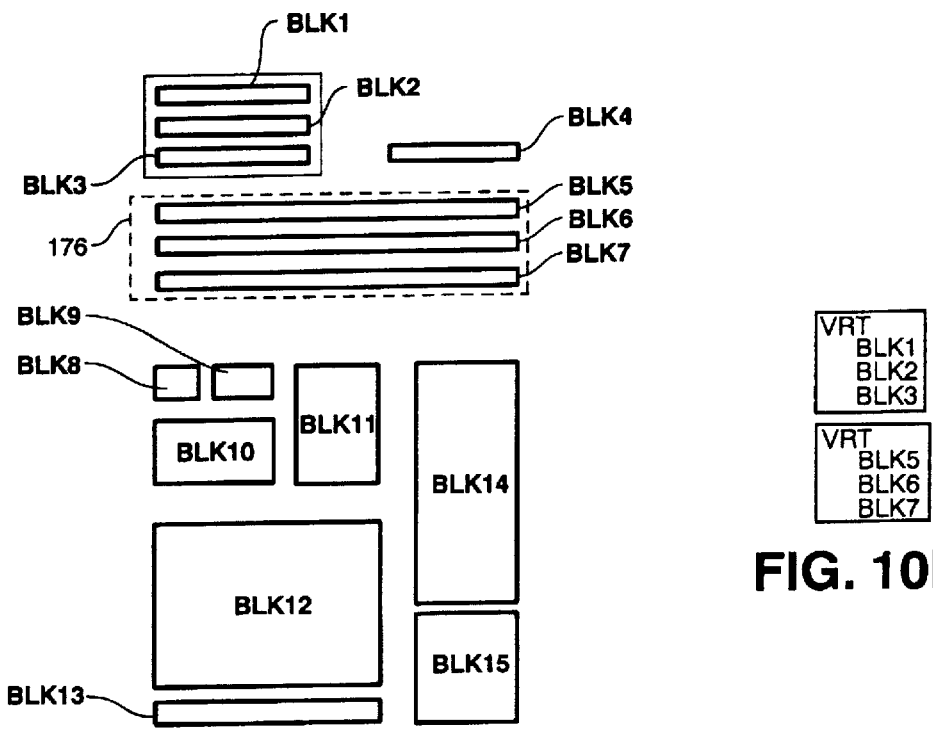
FIG. 10A-6
FIG. 10B-6

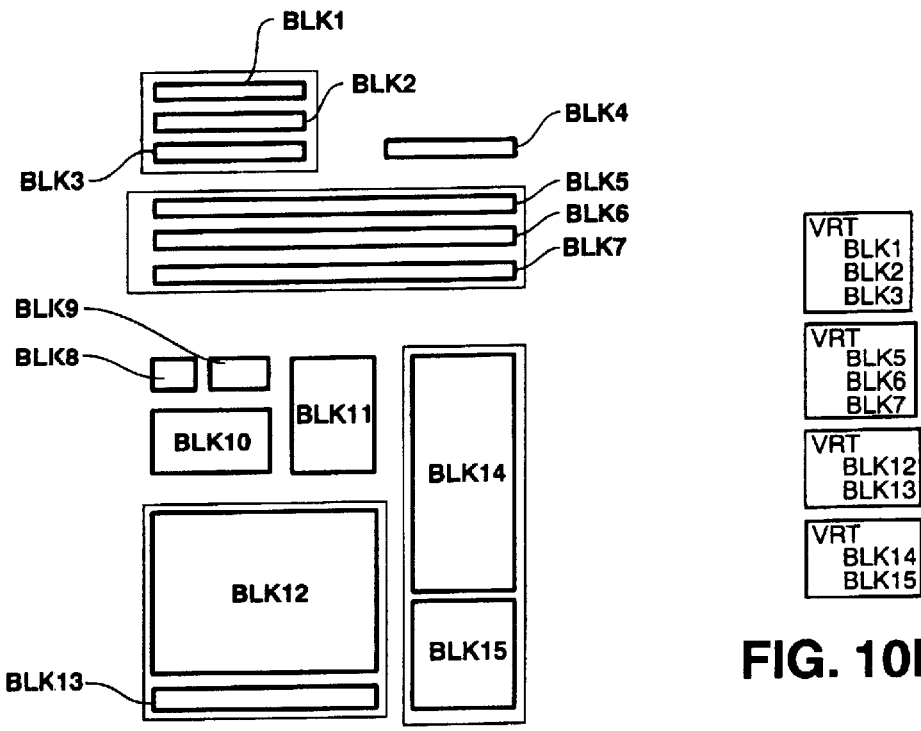
FIG. 10A-7
FIG. 10B-7
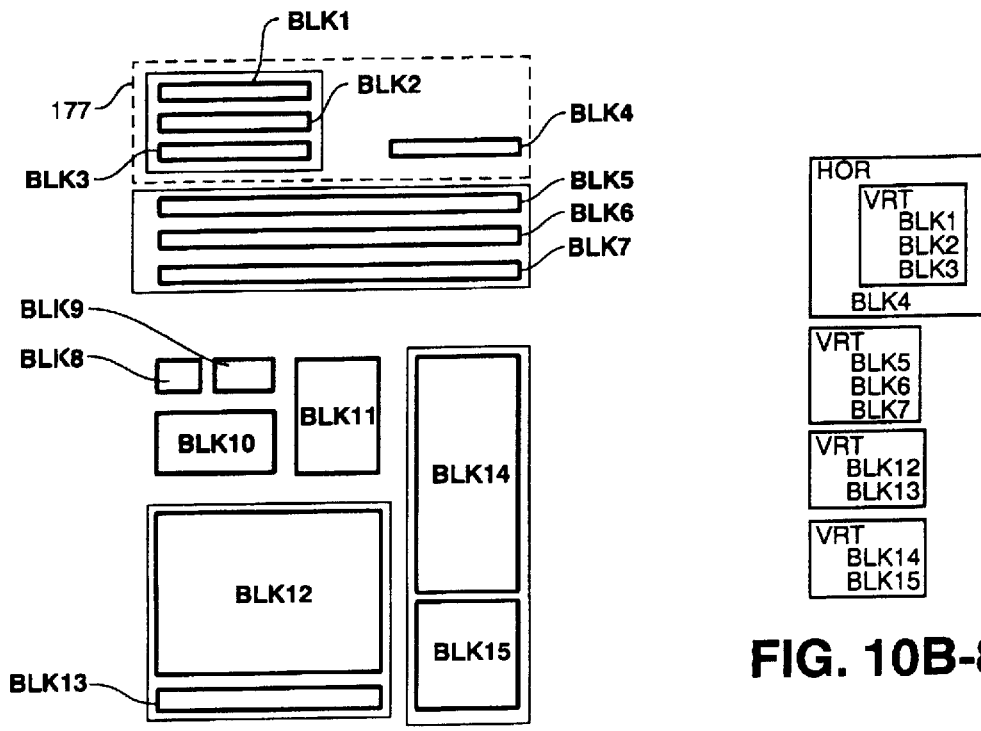
FIG. 10A-8
FIG. 10B-8

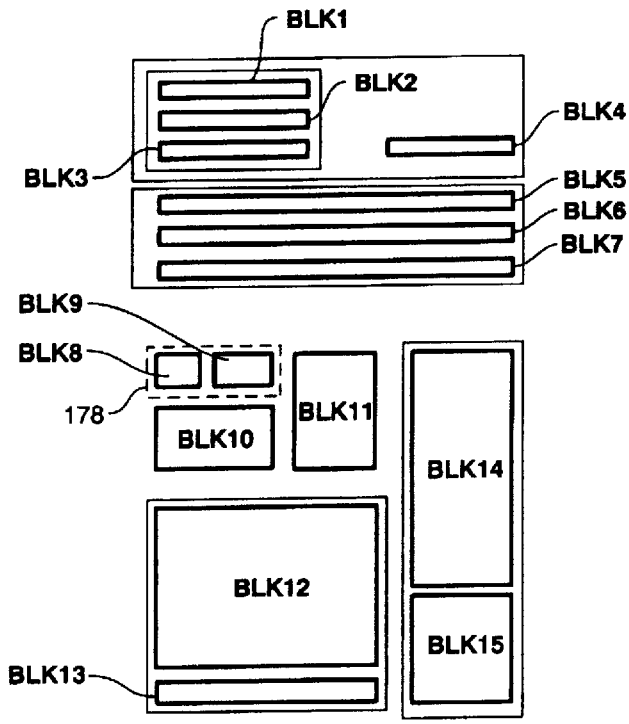
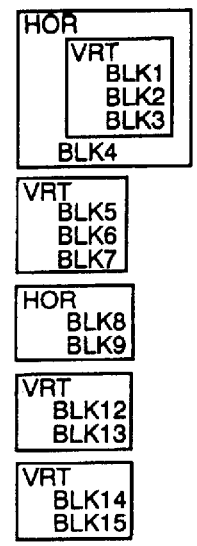
FIG. 10A-9    FIG. 10B-9
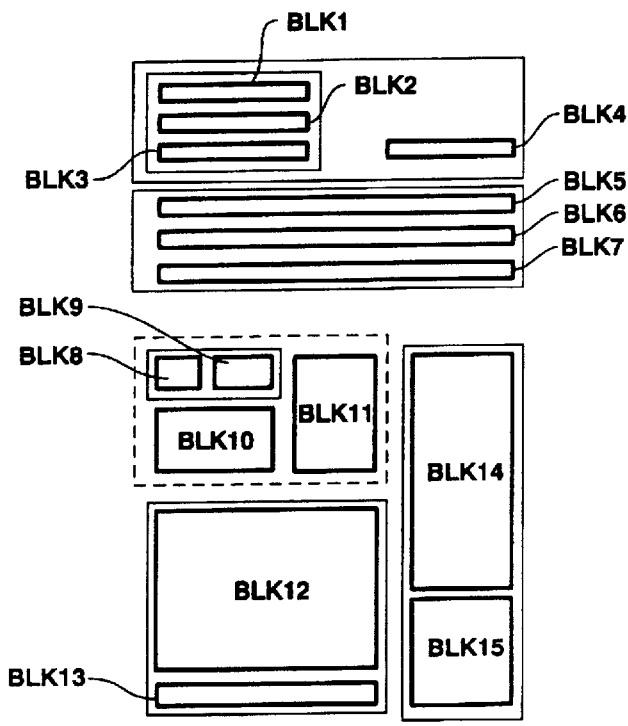
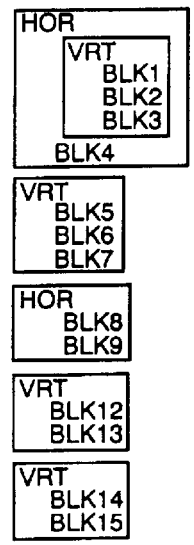
FIG. 10A-10    FIG. 10B-10

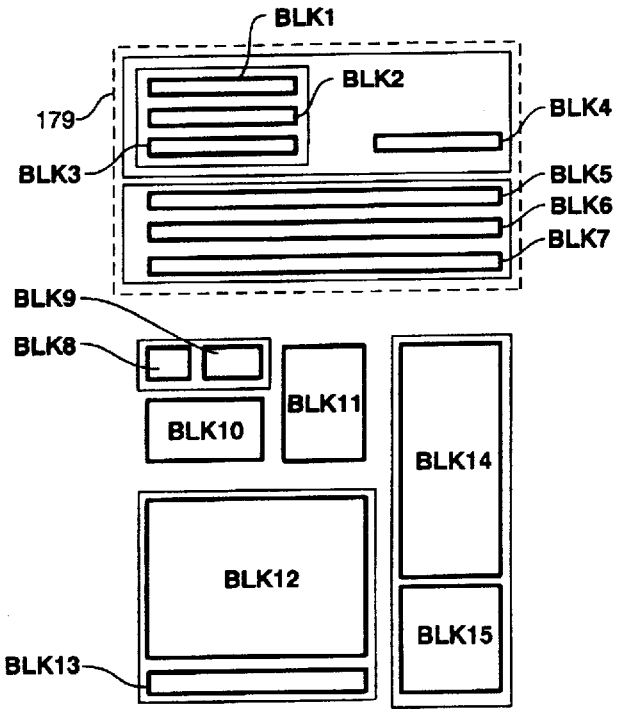
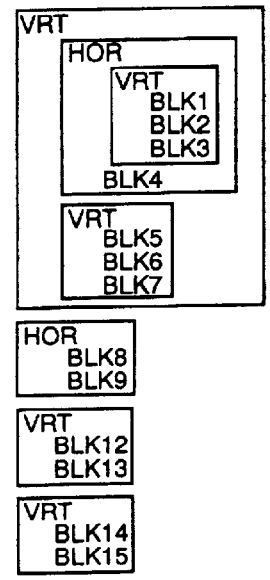
FIG. 10A-11          FIG. 10B-11
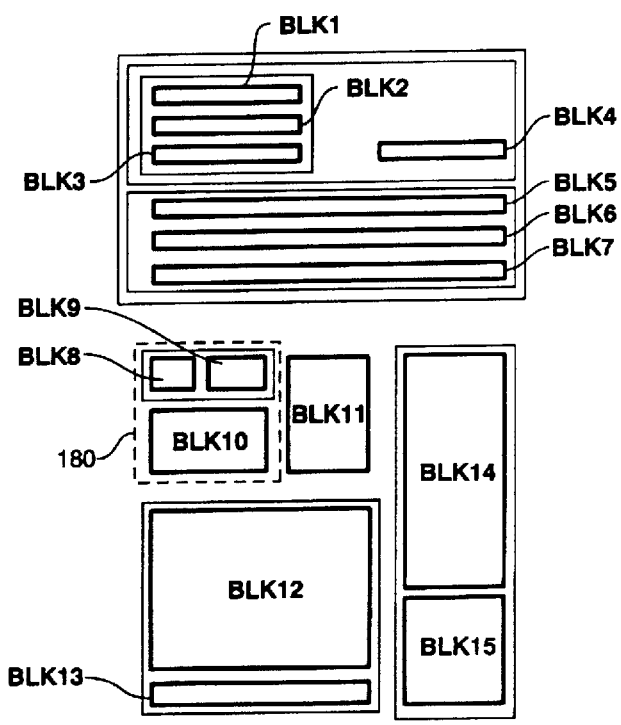
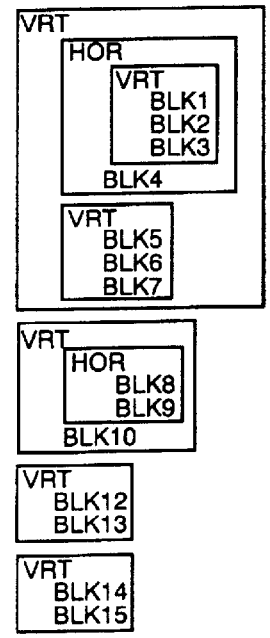
FIG. 10A-12          FIG. 10B-12

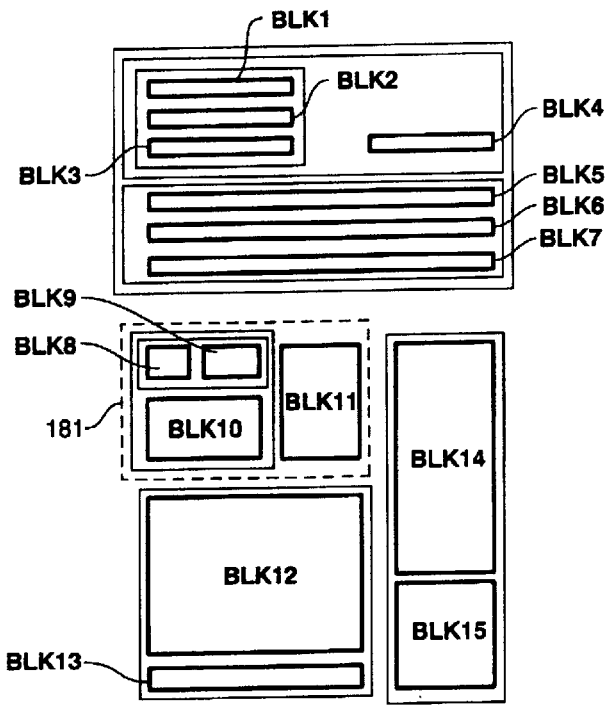 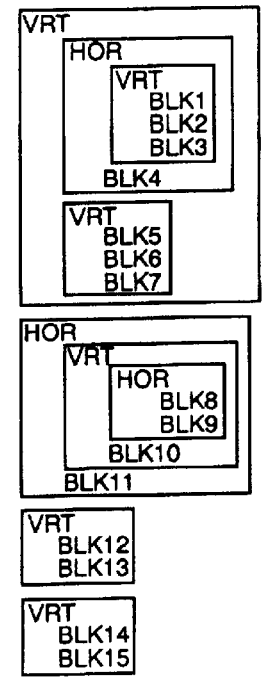
FIG. 10A-13  FIG. 10B-13
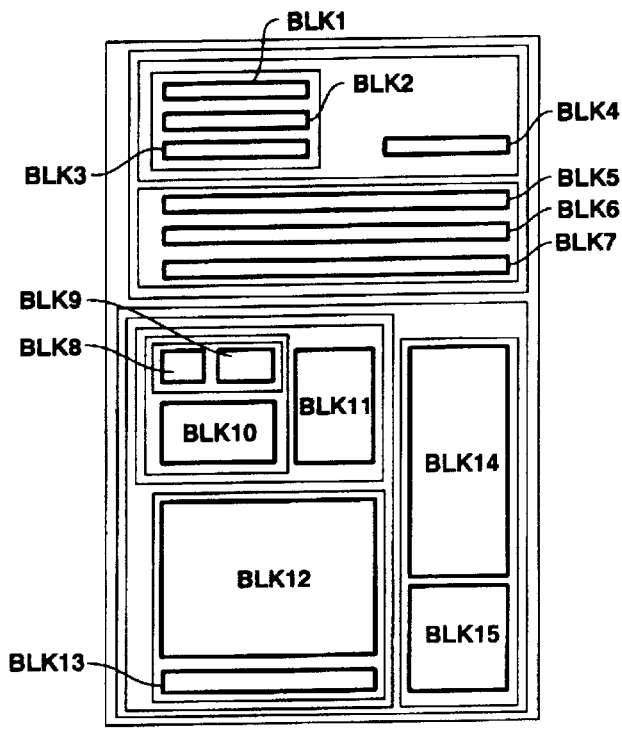 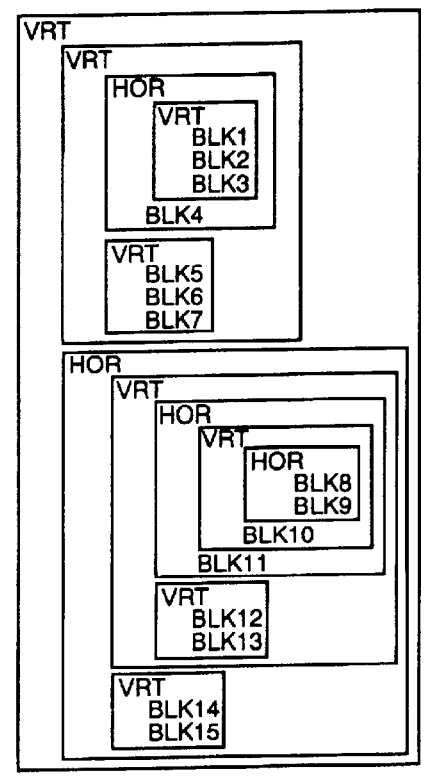
FIG. 10A-14  FIG. 10B-14

The universe from earth and earth from the universe

SPOTLIGHT ON TECHNOLOGY

Canon is putting its technolgical capabilities to work in satellite and telescope projects that will change the way we view our world. Hideo Yokota, general manager of the SO (space optics) project in Canon's optical products operations, tells the story.

Satellite projects to reveal happenings at home

Canon's first project building equipment for use on a satellite commenced in 1990. "The device we worked on," Yokota explained, "is part of an earth observation satellite program currently in the development stages." The SO (space optics) project team handled lens development for this device, which was completed in late 1995. The satellite itself will be launched in the late 1990s by America's National Aeronautics and Space Administration (NASA).

"The device using our lens monitors several bands in the thermal infrared region of the spectrum," Yokota continued, "making it useful for measuring thermal emission properties. This data will be used to study the warming of urban areas, the locations of mineral resources, the effects and extent of desertification, the movement patterns of marine life, and conditions in oceans and the atmosphere. The lens we developed improves geometric resolution, or the density of the land area covered, to 90 meters, enabling more detailed observation than previous systems."

The SO project team has also been involved in lens development for another satellite set to monitor conditions on planet earth. This observation satellite should be launched by the end of the century by the National Space Development Agency of Japan (NASDA).

"This time," Yokota said, "we are in charge of the lens system for a device similar to that developed in our first project. The difference is that this device will monitor spectral bands in the visable and near infrared regions, the short wavelength infrared region, and the middle and thermal infrared regions. The result will be a clearer picture of what is happening on land as well as in the sea and air.

Eyes in the night

"For this lens, high performance and a large aperture were required, which is why we decided on an aspherical lens surface. Light coming into the mirror will be separated and sent, as appropriate, to one of several cameras. Through this project, it will be possible to observe vegetation and other environmental patterns."

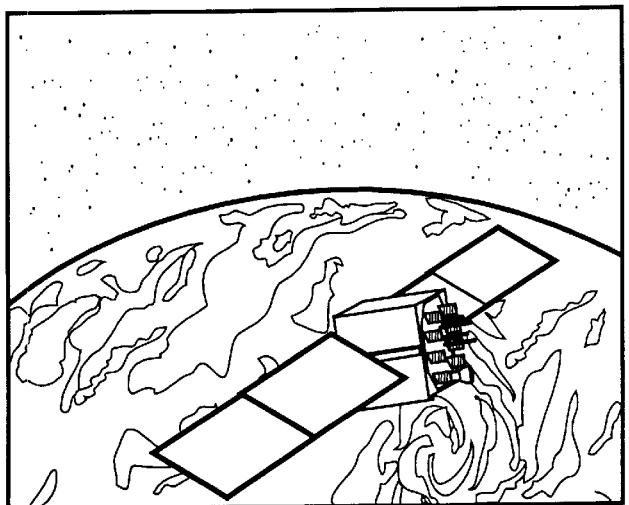

A. Shown here is an artist's rendition of optical communications between orbital satellites. (Illustration supplied by National Space Cevelopment Agency of Japan)

Canon Chronicle May -june 1996

FIG. 14

GENERATOR FOR DOCUMENT WITH HTML TAGGED TABLE HAVING DATA ELEMENTS WHICH PRESERVE LAYOUT RELATIONSHIPS OF INFORMATION IN BITMAP IMAGE OF ORIGINAL DOCUMENT

BACKGROUND OF THE INVENTION

1. Field of the Invention

The present invention concerns generating a hypertext markup language (HTML) file based on an input bitmap image, and is particularly directed to automatic generation of an HTML file, based on a scanned-in document image, with the HTML file in turn being used to generate a Web page that accurately reproduces the layout of the original input bitmap image.

2. Description of the Related Art

In recent years, the popularity of the internet has grown dramatically. One reason for such growth has been the widespread adoption of HTML (HyperText Markup Language), which is a language for describing document appearance, document layout and hyperlink specifications. It defines the syntax that describe the structure and the content of a document including text, images, and other supported media. The language also provides connections among documents and other Internet resources through hypertext links and other hyperlinks. Using HTML, a Web page can be created which contains, in addition to bitmap images, graphic images, and text of various styles and sizes, hyperlinks which permit a viewer of the Web page to easily jump to another point within the page or to a completely different Web page, even one that is provided by a different server.

Once an HTML file is made available on the World Wide Web via a server, any client connected to the World Wide Web can access the page merely by typing the page address in the appropriate field of his browser. After the address has been entered, the browser requests the server to send the HTML file, which can contain text, references to graphic and bitmap image files, and formatting and hyperlink information for the entire page. Upon receipt of the HTML file, the browser automatically requests the graphic and bitmap image files referenced in the HTML file from the identified source.

To display the HTML file and the downloaded image files, the browser relies on HTML commands embedded in the HTML file. These commands are referred to as "tags". The tags indicate features or elements of a page and cause the browser to perform various functions, such as a particular type of formatting. HTML tags can be identified in HTML files by their syntax. That is, the tags are surrounded by left and right angle brackets, such as "<P>". In this case, "<" indicates the start of the HTML tag, "P" is the tag itself (here a tag indicating a new text paragraph), and ">" indicates the end of the tag. Often, tags come in pairs so as to indicate the start and end of a special function. The beginning tag initiates a feature (such as heading, bold, and so on), and the ending tag turns it off. Ending tags typically consist of the initiating tag name preceded by a forward slash (/) For example, <strong> and </strong>, surrounding text, will display the surrounded text more strongly that other text. Any additional words in a tag are attributes, sometimes with an associated value after an equal sign (=), which further define or modify the tag's actions.

HTML 3.0 is presently the de-facto World Wide Web standard that defines permissible tags and nesting of tags. Approximately 100 different tags are permitted and defined. Because of the complexity of HTML 3.0, as well as its cumbersome usage requirements, considerable effort is expended by the Web designer when authoring visually appealing and useful Web pages. For example, assume that an organization had good existing written marketing materials which it wanted to reproduce identically on a Web page. Even this seemingly simple task has typically required that a specialist spend a significant amount of time authoring HTML instructions by hand in an attempt to reproduce the layout and appearance of the written materials.

Several systems have been proposed that would automate this job of authoring HTML files from written documents. Xerox Text Bridge Pro and Caere Omni Page Pro are examples of systems which scan in written documents and generate HTML files based on the scanned-in document image. Where these systems fail is in producing HTML files that accurately represent the layout, tables and images of the original written document. In particular, a major problem has been automatically generating HTML instructions for the case where the written document is arranged in columns, or, more generally, when regions in the original document are horizontally adjacent. The term "horizontally adjacent," when used with respect to two image blocks, means a situation where the vertical extent of the two blocks overlap, or, equivalently, where a horizontal line can be found which will intersect both blocks. Similarly, the term "vertically adjacent," when used with respect to two image blocks, means a situation where the horizontal extent of the two blocks overlap, or, equivalently, where a vertical line can be found which will intersect both blocks.

A typical example of the problems associated with such systems is illustrated by reference to FIGS. 1 and 2. FIG. 1 depicts an original printed document 10 to be converted into HTML format. As shown in FIG. 1, the original document, has, among other features: title 1 in the upper left corner, subtitle 2 in the upper right corner, text columns 4, 5 and 6, picture 7 in the lower left corner, and footer 9 in the lower right corner.

FIG. 2 illustrates how a Web page 20 would be displayed on display 23 by a Web browser based on the HTML file generated by an existing system for converting bitmap images into HTML. Elements in FIG. 2 corresponding to those in FIG. 1 are numbered similarly to those in FIG. 1. Thus, after processing by the existing system, title 1 is reproduced as title 11. However, subtitle 2, rather than being reproduced in the upper right corner, is instead reproduced as element 12 in the upper left corner, just below title 11. Similarly, the entire text column structure of the original document has been eliminated, and picture 17, rather than being in the lower left corner, occupies the entire width of the page and is interposed between lines of text. Finally, footer 19 is reproduced in the lower left corner, instead of the lower right corner.

The above comparison shows the complete failure of commercially available systems to capture many layout and stylistic elements of the original document. Other known available systems also too frequently miss important layout features. Accordingly, the problems caused by the complex and cumbersome nature of HTML are not adequately addressed by commercially available systems.

SUMMARY OF THE INVENTION

It is therefore an objective of the present invention to address the foregoing problems by providing a means by which an HTML file can be automatically generated based on a bitmap image, which HTML file can be used to display a Web page which preserves layout information of the original bitmap image. In particular, according to the invention, multi-column layouts are faithfully preserved by automatic generation of HTML files that use HTML "table tags" to display columns.

According to one aspect of the invention, an HTML file is generated based on a bitmap image by obtaining two horizontally adjacent blocks in separate vertical columns of the bitmap image, and then generating an HTML file in which the blocks are placed inside table cells by being tagged as data elements in a row of an HTML tagged table.

According to another aspect of the invention, an HTML file is generated based on a bitmap image. The bitmap image is first segmented to obtain image blocks. It is then determined where in the bitmap image each of the blocks is located. Next, positional relationships between the blocks are identified based on their relative locations. Finally, an HTML file is generated. In the HTML file, the blocks are tagged as data elements in an HTML tagged table, the tags being determined in accordance with the identified positional relationships.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 1 depicts an original printed document.

FIG. 2 depicts an HTML page displayed by a Web browser based on an HTML file generated by a commercially available system.

FIG. 3 is a perspective view showing the outward appearance of a workstation.

FIG. 4 is a block diagram of the workstation depicted in FIG. 3.

FIGS. 10A-1 through 10A-14 are views for explaining iterative processing of layout analysis on the blocks depicted in FIG. 6. FIGS. 10B-1 through 10B-14 are views for explaining generation of layout data for each corresponding iteration of FIGS. 10A-1 through 10A-14.

FIG. 12 is a view for explaining output of block type determination based on layout data.

FIG. 14 is a view showing an HTML page displayed by a Web browser based on an HTML document automatically generated in accordance with the invention.

DETAILED DESCRIPTION OF THE PREFERRED EMBODIMENTS

Figure 5:
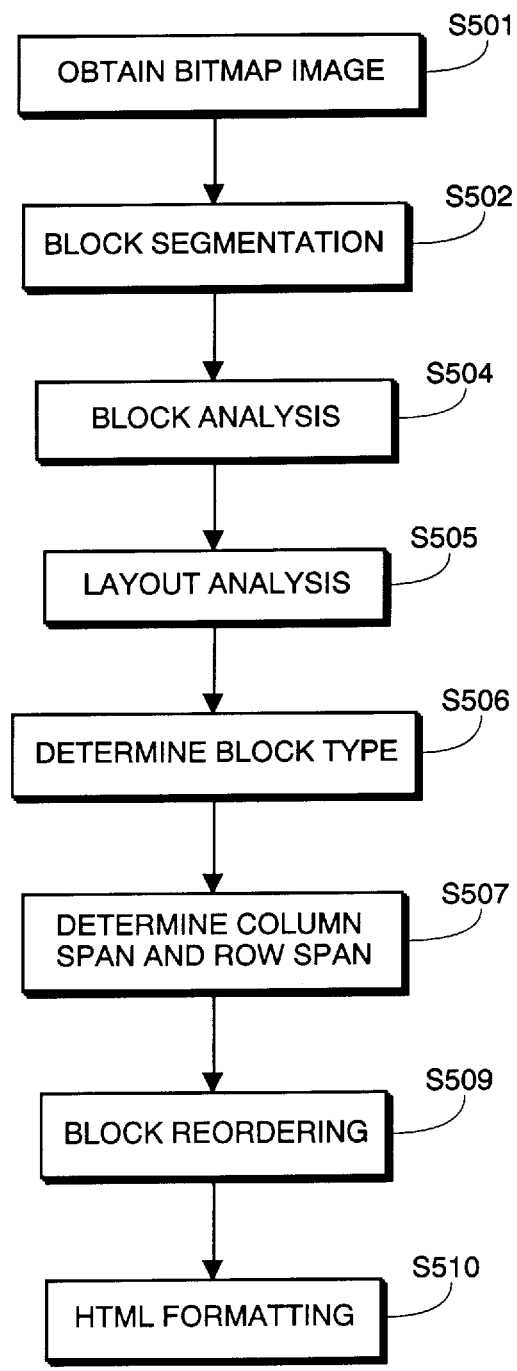
FIG. 5 is a flow diagram illustrating a method for generating an HTML file based on a bitmap image.

FIG. 3 is a view showing the outward appearance of a computer workstation for implementing the present invention. Shown in FIG. 3 is a workstation 30, such as a Macintosh or an IBM PC or PC-compatible computer having a windowing environment, such as Microsoft Windows. Provided with the workstation 30 is a display screen 31, such as a color monitor, a keyboard 32 for entering user commands, and a pointing device 34, such as a mouse, for pointing to and for manipulating objects displayed on the screen 31. The workstation 30 includes a mass storage device such as a computer disk 35 for storing data files. A scanner 37 is provided for generating a bitmap image from an input printed document.

FIG. 4 is a detailed block diagram showing the internal construction of the workstation 30. As shown in FIG. 4, the workstation 30 includes a central processing unit (CPU) 41 interfaced with a computer bus 42. Also interfaced with the computer bus 42 is a scanner interface 44, a display interface 45, a keyboard interface 46, a mouse interface 47, a main memory 49, and a fixed disk 35. Disk 35 stores a windowing operating system, such as Microsoft Windows, various Windows applications, an HTML Conversion Program for generating an HTML file based on a bitmap image according to the present invention, previously scanned bitmap images, previously generated HTML files, and a Web browser for displaying HTML files. The main memory 49 interfaces with the computer bus 42 so as to provide random access memory storage for use by the CPU 41 while executing stored process steps such as those of the HTML Conversion Program. More specifically, the CPU 41 loads those process steps from the disk 35 into the main memory 49 and executes those stored process steps out of the main memory 49.

[Generation of HTML]

FIG. 5 is a flow diagram comprised of process steps stored on disk 35 for generating an HTML file based on a bitmap image according to the present invention. Briefly, according to FIG. 5, a bitmap image is obtained, such as by scanning or retrieval, and segmented into blocks. The location of each block is determined, each block is analyzed in preparation for insertion into an HTML file, and layout analysis is performed to identify layout relationships.between the blocks based on the relative locations in the bitmap image. Based on the layout relationships, a block type is determined for each block, column span and row span for each block is determined, blocks are reordered if needed, and an HTML file is generated based on block type and column and row span information for the blocks.

[Obtaining A Bitmap Image]

More particularly, in step S501 a bitmap image is obtained. Typically, this is accomplished by scanning a printed document using scanner 37. However, the bitmap image may also be retrieved from a file stored on disk 35 or in any other manner.

[Block Identification and Segmentation]

Step S502 comprises process steps by which blocks in the image data are automatically detected and their locations with respect to the image are automatically identified. A "block" is a logically-related group of image data, such as a region of consecutive paragraphs of text image data, a region comprising title image data, or regions comprising non-text image data such as graphical image data, line drawing image data, picture data, or tabular image data. Preferably, in addition to automatic detection and identification of blocks and their locations, block segmentation according to step S502 also generates hierarchical tree data by which the logical relationship of each block with respect to other blocks is identified. For example, text image data is often found within non-text image data, such as in the case of text labels within a line-art graphic. In such a situation, the text labels would be identified in the hierarchical tree as a child node of the parent block that contains the graphic. Hierarchical Tree data such as this is useful in subsequent processing steps so as to determine the relationship of each of the blocks.

Suitable block segmentation techniques are described in the literature, and in U.S. Pat. No. 5,680,479 which issued Oct. 21, 1997 from patent application Ser. No. 07/873,012 filed Apr. 24, 1992 and is entitled "Method And Apparatus For Character Recognition", and in co-pending patent application Ser. No. 08/338,781 filed Nov. 10, 1994 entitled "Page Analysis System." The contents of these two patent applications are incorporated herein by reference as if set forth in full. Generally speaking, such block segmentation techniques work by analyzing individual pixel data within the image so as to identify connected components of the image, analyzing the connected components so as to determine whether a connected component is a text connected component or a non-text connected component, and thereafter grouping the connected components into blocks. The text and non-text blocks are then analyzed so as to determine attributes of each block. For example, in the case of text blocks, the blocks are analyzed to determine whether they are titles, plain text, captions to figures, and the like. In the case of non-text blocks, the blocks are analyzed to determine whether they are line-art images, half tone images, color images, tabularly arranged data, and the like. At the same time, a hierarchical tree is generated showing, through parent-child nodal relationships, the relationships of the text and non-text blocks within the image data.

Figure 6:
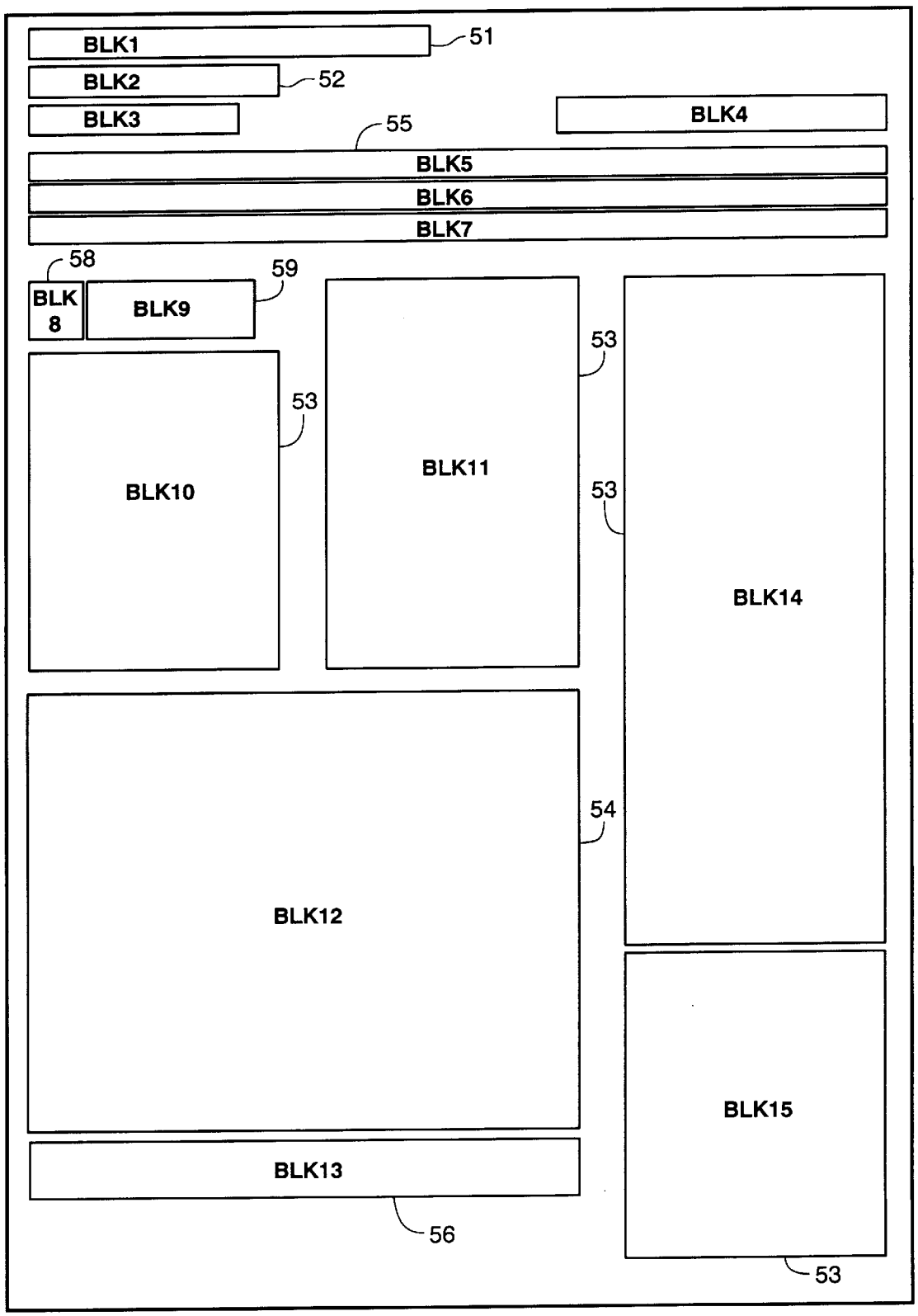
FIG. 6 is a diagram illustrating output of block selection analysis performed on the printed document of FIG. 1.

FIG. 6 is an illustration of the results of block segmentation according to step S502. As shown in FIG. 6, and with respect to original image data illustrated in FIG. 1, a first block 51 (BLK1) corresponds to the first line of title data of FIG. 1. Likewise, a second block 52 (BLK2) corresponds to the second line of title data of FIG. 1. A fifth block 55 (BLK5) corresponds to the first line of the subtitle. An eighth block 58 (BLK8) corresponds to the large "S" in the article's caption, whereas a ninth block 59 (BLK9) corresponds to the remainder of the text in the article's caption. Blocks 53 (BLK10, BLK11, BLK14 and BLK15) correspond to text in the article itself. Block 54 (BLK12) corresponds to the half-tone image in the article whereas block 56 (BLK13) corresponds to the textual caption for that image. Other blocks shown in FIG. 6 have meanings that can readily be appreciated from the foregoing.

Figure 7:
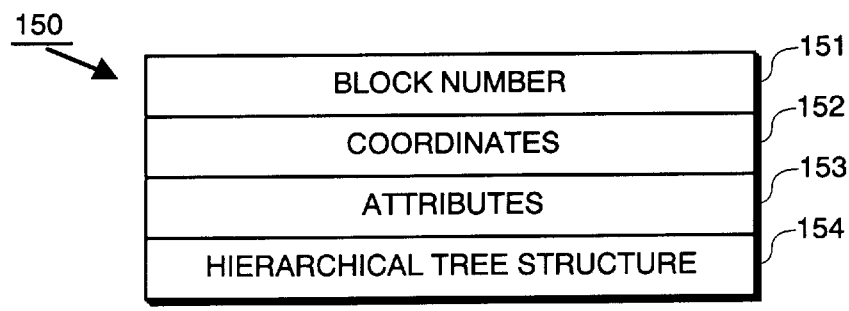
FIG. 7 is a view for explaining data output by block segmentation analysis.

FIG. 7 is a view for explaining data that is stored for each block, including attribute data and hierarchical tree structure data. Specifically, and as shown in FIG. 7, for each block, block data 150 is stored, and includes at least block number identification 151, coordinate information 152 (such as upper-left and lower-right coordinates of a circumscribing rectangle for the block), attribute data 153 which stores whether the block is text or non-text, together with any other attributes determined during block segmentation, and hierarchical tree structure 154 which includes pointers to parent and child nodes for the block.

Summarizing, at the end of block segmentation in step S502, image data has been analyzed so as to automatically detect blocks of logically-related image data and to automatically identify locations of those blocks. In addition, hierarchical tree structure showing the logical relation from one block to another has been stored for each such block.
[Block Analysis]

Block analysis in step S504 comprises process steps by which each of the blocks identified in step S502 is analyzed so as to determine whether it is a block that affects document layout, and, if so, to extract needed information for HTML generation.

Specifically, for each block identified in step S502, block analysis according to step S504 determines whether the block affects document layout by inspecting the hierarchical tree to determine whether the block is a text block that is not a child of a non-text block. The purpose of this test is to eliminate from further processing any text block that is within a non-text block, inasmuch as such a text block does not affect document layout. For example, a textual label within a line-art graphic does not affect document layout; rather, it is the histogram that affects document layout. Accordingly, by inspecting the hierarchical tree generated in step S502, it is possible to distinguish between blocks that affect document layout from blocks that do not affect document layout.

On the other hand, non-text blocks, such as line-art drawings, half-tone images and tabular data, presumptively affect document layout and are therefore targeted for further analysis in step S504.

In the context of the FIG. 6 example, it will be appreciated that all blocks shown there affect document layout. Accordingly, no blocks are eliminated from further processing. This would not be the case, for example, in the situation where a document image included textual data within an image or a table. In those situations, the block containing such textual data would be eliminated from further processing, since such a text block does not affect document layout but rather the image block affects document layout.

All blocks so identified as affecting document layout are thereafter processed in accordance with image attributes 153 in preparation for HTML generation. Specifically, if image attribute 153 identifies the block as non-text data such as a half-tone image, then block analysis in step S504 generates a suitable image file for the image. Preferably, the image file is stored in a commonly used Web browser format, such as .GIF or JPEG format. On the other hand, for text-type blocks, the block is subjected to optical character recognition analysis so as to obtain a file of computer readable character codes such as ASCII character codes for subsequent use in HTML generation, and also to determine the number of text lines in each text block.

Figure 8:
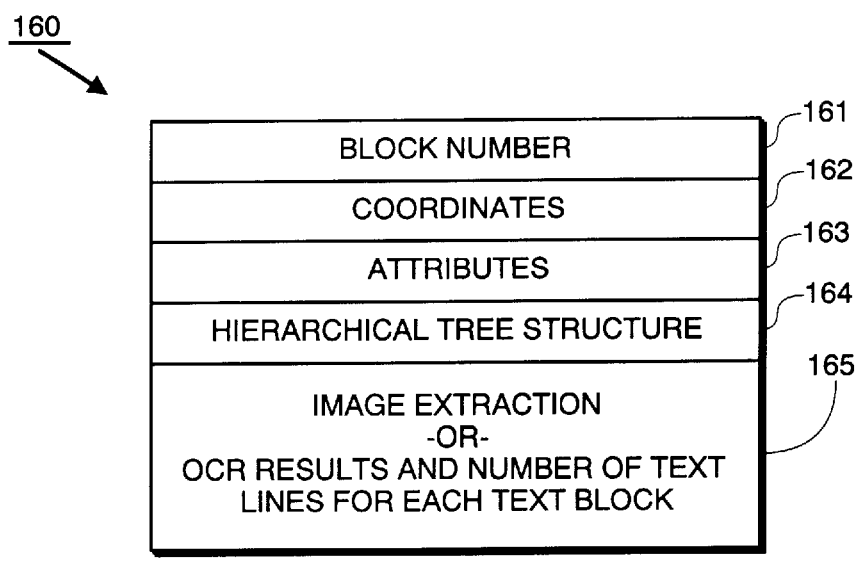
FIG. 8 is a view for explaining output of block analysis.

FIG. 8 is a view for explaining the output of block analysis in step S504. Particularly, as shown in FIG. 8, for each block that affects document layout, data 160 is stored containing at least block number 161, coordinate data 162, attribute data 163 which is the same attribute data as attribute data 153 of FIG. 7, hierarchical tree data 164 which is the same as hierarchical tree data 154 of FIG. 7 with the exception that child node information may be omitted, and block analysis results 165. Block analysis results 165 may include, for example, an image file name in the case where attribute data 163 indicates that the block is non-text data, or may include optical character recognition results and number of text lines in each text block in the case where attribute data 163 indicates that the block is text-type data.

Summarizing, block analysis according to step S504 results in identification of those blocks that affect document layout, and for each of those blocks, an image file or optical character recognition results.
[Layout Analysis]

Figure 9:
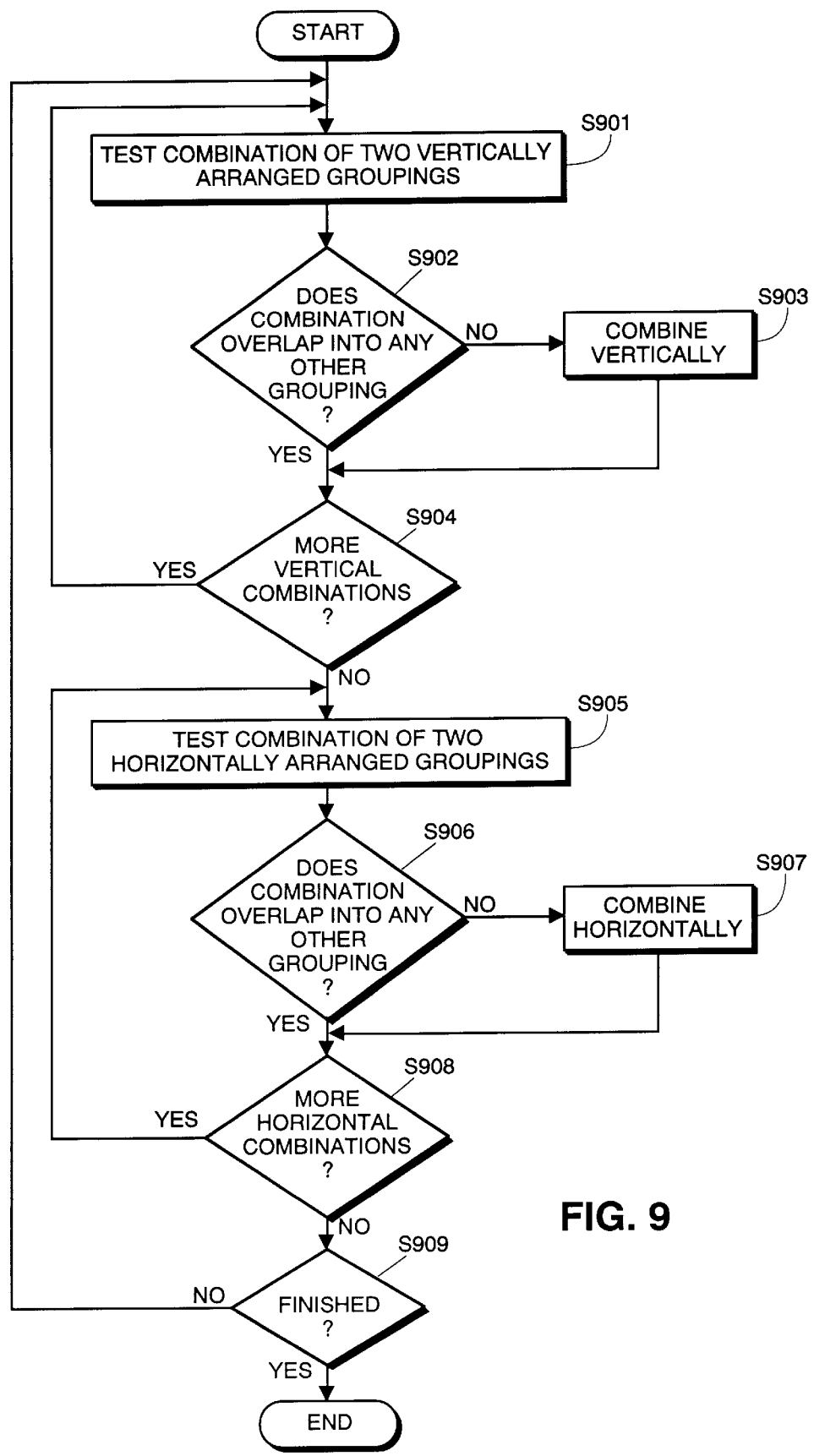
FIG. 9 is a flow diagram for explaining layout analysis and generation of layout data based on block analysis.

Step S505 of FIG. 5 comprises process steps by which the blocks identified in step S504 are analyzed so as to provide layout data for the document. These process steps are illustrated in FIG. 9. Generally speaking, the process steps of FIG. 9 test each possible combination of pairs of vertically arranged blocks or groupings of blocks to determine whether the smallest rectangle which circumscribes the pair of blocks overlaps onto any other blocks, and if the combination does not overlap, the pair is combined into a single grouping. Likewise, each possible combination of pairs of horizontally arranged blocks or groupings of blocks are tested to determine whether the combination overlaps onto any other blocks, and if there is no overlap the pair is combined into a horizontal grouping. Vertical combinations are tested first since most english language documents are arranged into vertical layouts; accordingly, in situations where it can be expected for documents to be arranged in horizontal layouts, such as in some Japanese language documents, horizontal groupings should be tested first. The process of testing vertical groupings and then horizontal groupings is repeated until there are no further groupings that can be made and the entire document has been combined into a single grouping, whereupon the layout data is complete.

FIG. 9 will now be explained in more detail, in connection with the illustrative example of FIG. 10 which is based on the document of FIG. 1. Thus, in step S901, a combination of two vertically arranged "groupings" is first tested. Groupings are either individual blocks or blocks that have previously been combined into a single grouping. "Vertically-arranged" groupings are groupings that differ in location vertically; thus, groupings that do not differ in the vertical direction, as measured based on coordinate data 162, are not tested in this step S901.

An illustrative example of a first such combination is shown in FIG. 10A-1. As shown in FIG. 10A-1, blocks BLK1 and BLK2 are vertically-arranged in the sense that they differ in vertical locations. A dotted line 171 represents a circumscribing rectangle that encloses these two blocks. It is this combination as represented by the circumscribing rectangle that is tested in step S902. For illustrative purposes, a small gap is shown between the rectangle and the enclosed blocks. However, it should be noted that the actual grouping border will generally coincide with the block borders.

Specifically, step S902 tests to determine whether the combination of vertically-arranged groupings overlaps onto any other grouping. A combination would overlap onto another grouping if, when making the combination, the combination would include all or any part of any other block or grouping. If the combination does not overlap onto any other grouping, then flow branches to step S903 in which the groupings are combined vertically into a vertical grouping. On the other hand, if the combination does overlap onto any other grouping, then flow advances directly to step S904 which determines whether there are any more vertical combinations that need testing. If more vertical combinations need testing, then flow returns to step S901 until all vertically-arranged groupings are suitably tested.

Thus, reverting to FIG. 10A-1, since circumscribing rectangle 171 does not overlap onto any other groupings (step S902), blocks BLK1 and BLK2 are combined vertically into a single vertical grouping (step S903). This is illustrated graphically in FIG. 10B-1 which shows layout data depicting the combination of blocks BLK1 and BLK2 into a single vertical grouping.

Referring now to FIG. 10A-2, since more vertical combinations exist (step S904), those vertical combinations are tested. Thus, in FIG. 10A-2, a circumscribing rectangle 172 represents the combination of the vertical grouping that is comprised of blocks BLK1 and BLK2 as well as vertically-arranged block BLK3. Since the combination does not overlap onto any other grouping, the combination is combined vertically into a new grouping as illustrated in the layout data of FIG. 10B-2.

In FIG. 10A-3, block BLK4 is not tested since, based on coordinate data 163, it is not a vertically-arranged grouping. Rather, the next block that is tested is block BLK5 since it is a vertically-arranged grouping. The circumscribing rectangle for the combination is illustrated with dotted line 173. As can be appreciated, the combination includes block BLK4. Thus, the combination overlaps onto another grouping, and a vertical combination is not made. Thus, as illustrated in FIG. 10B-3, the layout remains the same.

As can readily be appreciated, any other combination of the vertical grouping of blocks BLK1, BLK2 and BLK3, when combined with any other block of the document, will result in an overlap onto some other grouping. Accordingly, when each test is made in step S901, step S902 will determine that the combination overlaps onto some other grouping, and no further vertical combinations will be made with this grouping.

Referring now to FIG. 10A-4, combinations of vertical groupings with the next permissible block or grouping, here block BLK4, are now made. Circumscribing rectangle 174, which shows a combination of block BLK4 with block BLK5, clearly shows that an overlap exists with block BLK3. Thus, since the combination overlaps onto another grouping, a vertical combination is not made and the groupings remain as shown in the layout data of FIG. 10B-4. Likewise, it can be understood that combinations with any other block with BLK4 will result in an overlap, and no further vertical combinations are made.

Referring now to FIG. 10A-5, combinations of vertically-arranged groupings with block BLK5 are tested. Dotted line 175 represents a circumscribing rectangle for the combination of blocks BLK5 and BLK6. Since no overlaps onto any other grouping exist, blocks BLK5 and BLK6 are combined vertically as illustrated in the layout data of FIG. 10B-5.

Likewise, in FIG. 10A-6, the grouping of blocks BLK5 and BLK6 are then tested in combination with block BLK7, as illustrated by circumscribing rectangle 176. Since the combination does not overlap onto any other grouping, the groupings are combined vertically as illustrated in the layout data of FIG. 10B-6.

The process of testing vertical combinations of groupings continues until there are no more permissible vertical combinations that can be tested. In connection with this testing, it will be appreciated that the only further groupings that can be combined are blocks BLK12 and BLK13 and blocks BLK14 and BLK15. This situation is illustrated in FIGS. 10A-7 and 10B-7.

Since no further vertical combinations are available for testing, flow then advances to step S905, in which similar combinations and testing of combinations are made in the horizontal direction. Thus, step S905 tests combinations of two horizontally-arranged groupings, step S906 determines whether the combination overlaps onto any other groupings, step S907 combines groupings horizontally in a case where step S906 determines that the combination does not overlap them to any other grouping, and step S908 determines whether there are any more horizontal combinations that need testing.

Specifically, reverting to FIG. 10A-8, the grouping of blocks BLK1, BLK2 and BLK3 is tested in combination with horizontally-arranged block BLK4. As seen in FIG. 10A-8, circumscribing rectangle 177 does not overlap onto any other groupings and the combination is therefore made. This is illustrated graphically in the layout data of FIG. 10B-8.

No other tests are made with respect to the new horizontal grouping of blocks BLK1 through BLK4 since, as will be appreciated, no other blocks or grouping of blocks is horizontally arranged. Likewise, no block or grouping of blocks is horizontally arranged with the vertical grouping of blocks BLK5 through BLK7, and no testing for these blocks is made.

Accordingly, the next block tested for combinations of horizontally arranged grouping is block BLK8 and the first such combination is with block BLK9. Inasmuch as circumscribing rectangle 178 does not overlap onto any other block, the horizontal combination is made as illustrated in the layout data of FIG. 10B-9.

The new grouping of blocks BLK8 and BLK9 is not tested with block BLK10 because block BLK10 is not horizontally arranged. Block BLK11 is horizontally arranged, but as shown in FIG. 10A-10, horizontal combination of the two overlaps onto BLK10 and accordingly no combination is made. Accordingly, the groupings remain as shown in the layout data of FIG. 10B-10.

All other combinations of horizontally-arranged groupings also overlap onto other blocks and/or groupings. Accordingly, when formed in step S905 and when tested in step S906, no further horizontal combinations are made.

Flow then advances to step S909 to determine whether all blocks in the image have been incorporated into a single overall group. So long as blocks remain not grouped into one overall grouping, the process steps of S901 through S908 are iterated until all blocks are contained within one grouping.

Thus, as illustrated with respect to FIG. 10A-11, the horizontal grouping containing blocks BLK1 through BLK4 is tested in combination with the vertical grouping containing the blocks BLK4 through BLK6, as illustrated by circumscribing rectangle 179. Since no blocks overlap, a combination is made vertically as illustrated in the layout data of FIG. 10B-11.

Likewise, in FIG. 10A-12, the horizontal grouping containing blocks BLK8 and BLK9 is tested with respect to block BLK10, as illustrated by circumscribing rectangle 180. Since no blocks are overlapped, a vertical grouping is made as illustrated in the layout data of FIG. 10B-12.

In this iteration of steps S901 through S904, no further vertical combinations are overlap-free. Accordingly, no further vertical combinations are made.

FIG. 10A-13 illustrates that, with respect to this iteration of horizontal steps S905 through S908, one further horizontal grouping can be made as illustrated at circumscribing rectangle 181. Accordingly, the groupings are as shown at FIG. 10A-13 and in the layout data of FIG. 10B-13.

Further vertical and horizontal iterations are made of steps S901 through S908, resulting in a final situation that is shown at FIGS. 10A-14 and 10B-14. It will be appreciated that the document has been arranged into one overall grouping, in this case a vertical grouping, which encompasses the entire document. Layout analysis thereupon concludes with storage of the layout data, together with storage of coordinates that identify circumscribing rectangles for each and every block or grouping of blocks and preferably also storage of width and height of each block. The layout data that is stored for the document of FIG. 1 is reproduced below as an illustrative example:

VRT: (1, t, r, b, w, h) = (48, 72, 2247, 3167, 2200, 3096)
  VRT: (1, t, r, b, w, h) = (48, 72, 2247, 763, 2200, 692)
    HOZ: (1, t, r, b, w, h) = (52, 72, 2247, 423, 2196, 352)

-continued

VRT: (1, t, r, b, w, h) = (52, 72, 1311, 415, 1260, 344)
        BLK1: (1, t, r, b, w, h) = (52, 72, 1311, 187, 1260, 116)
        BLK2: (1, t, r, b, w, h) = (56, 192, 827, 295, 772, 104)
        BLK3: (1, t, r, b, w, h) = (52, 316, 679, 415, 628, 100)
      BLK4: (1, t, r, b, w, h) = (1520, 380, 2247, 423, 728, 44)
    VRT: (1, t, r, b, w, h) = (48, 524, 2247, 763, 2200, 240)
      BLK5: (1, t, r, b, w, h) = (52, 524, 2247, 587, 2196, 64)
      BLK6: (1, t, r, b, w, h) = (48, 612, 2247, 675, 2200, 64)
      BLK7: (1, t, r, b, w, h) = (52, 696, 2091, 763, 2040, 68)
  HOZ: (1, t, r, b, w, h) = (48, 896, 2247, 3167, 2200, 2272)
    VRT: (1, t, r, b, w, h) = (48, 896, 1487, 3159, 1440, 2264)
      HOZ: (1, t, r, b, w, h) = (48, 896, 1487, 1819, 1440, 924)
        VRT: (1, t, r, b, w, h) = (48, 896, 727, 1815, 680, 920)
          HOZ: (1, t, r, b, w, h) = (56, 896, 551, 1059, 496, 164)
            BLK8: (1, t, r, b, w, h) = (56, 908, 131, 1035, 76, 128)
            BLK9: (1, t, r, b, w, h) = (144, 896, 551, 1059, 408, 164)
          BLK10: (1, t, r, b, w, h) = (48, 1084, 727, 1815, 680, 732)
        BLK11: (1, t, r, b, w, h) = (812, 900, 1487, 1819, 676, 920)
      VRT: (1, t, r, b, w, h) = (48, 1888, 1487, 3159, 1440, 1272)
        BLK12: (1, t, r, b, w, h) = (48, 1888, 1487, 2919, 1440, 1032)
        BLK13: (1, t, r, b, w, h) = (48, 2940, 1427, 3159, 1380, 220)
    VRT: (1, t, r, b, w, h) = (1568, 904, 2247, 3167, 680, 2264)
      BLK14: (1, t, r, b, w, h) = (1572, 904, 2247, 2499, 676, 1596)
      BLK15: (1, t, r, b, w, h) = (1568, 2524, 2247, 3167, 680, 644)

wherein "l", "t", "r" and "b" refer to left, top, right and bottom block coordinates, and wherein "w" and "h" refer to the width and height of the corresponding block.

Also in this step the block order is determined according to the order of the blocks in the layout data when read from top to bottom. Thus, in the present example the block order is: BLK1, BLK2, BLK3, BLK4, BLK5, BLK6, BLK7, BLK8, BLK9, BLK10, BLK11, BLK12, BLK13, BLK14, BLK15.

[Determining Block Type]

Figure 11A:
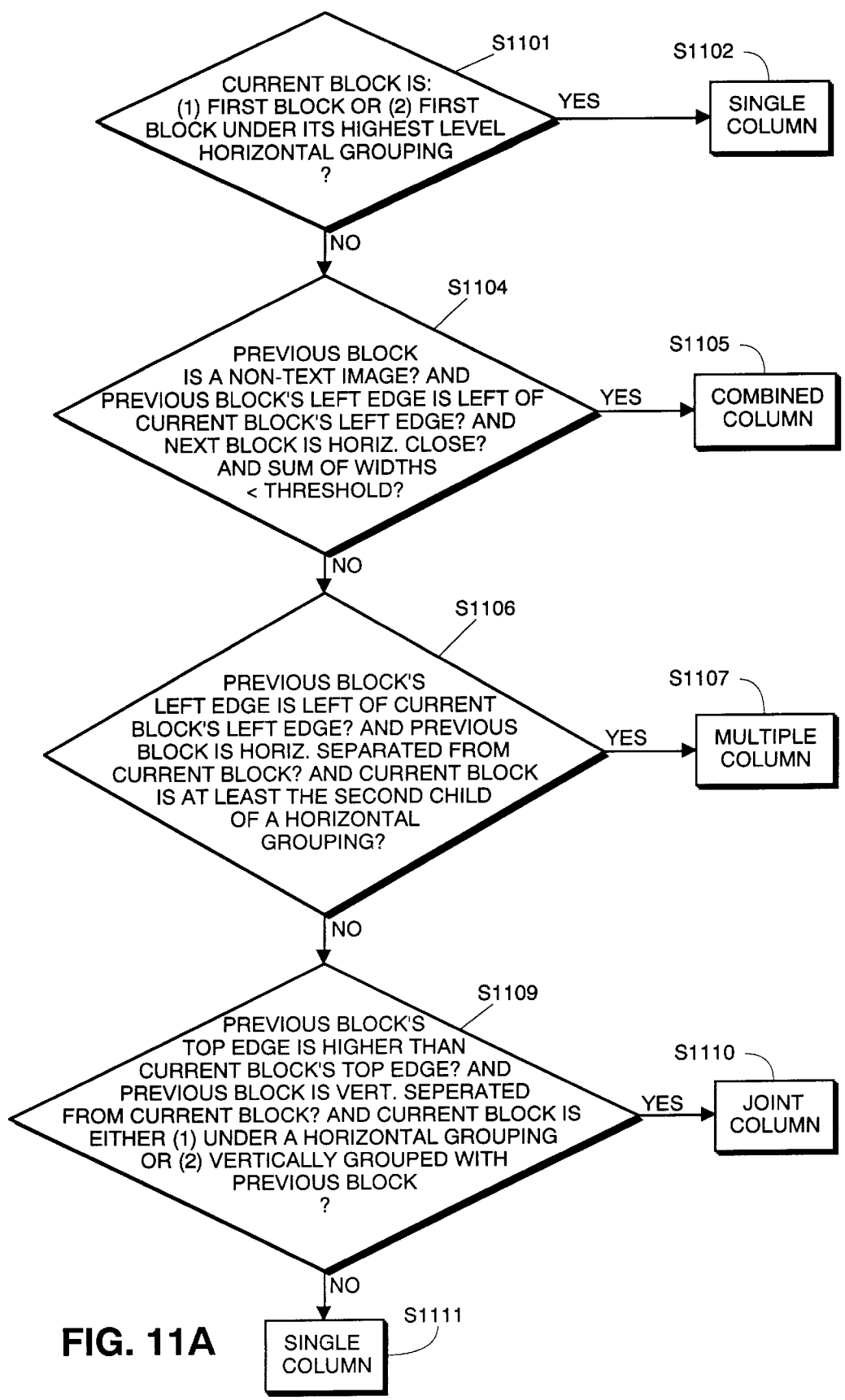
FIG. 11A is a flow diagram illustrating identification of block type according to the present invention.

Step S506 shown in FIG. 5 will now be discussed in more detail with reference to FIG. 11. Generally according to FIG. 11A, a type is determined for each block by successively performing a series of tests and either designating the block type when a test is first passed (the designation depending upon which test was passed) or designating the default block type in the event that none of the tests is passed.

More particularly, in step S1101 it is determined whether the current block is the first block encountered. It is also determined whether the current block is included, somewhere up the tree structure, in a horizontal grouping, and if so, whether it is the first block under its highest-level horizontal grouping. If either of the foregoing are answered affirmatively, then in step S1102 the block is designated "single column". If not, processing proceeds to step S1104.

In step S1104, a four-part test is applied. First, it is determined whether the previous block is a non-text image. Second, a determination is made whether the previous block's left edge is to the left of the current block's left edge. For purposes of describing these tests, the "current" block refers to the block for which a type presently is being determined, and the "previous" block refers to the block immediately preceding the current block in the ordered list identified in step S505.

The third part of the step S1104 test is to determine whether the right edge of the current block is close to the left edge of the next block. In the preferred embodiment, the answer to this part is yes only if the distance between the two is less than 0.01 times the width of the entire image (i.e., including all blocks). Fourth, it is determined whether the sum of the width of the current block and the next block is less than a fixed threshold. In the preferred embodiment, the threshold is equal to 0.6 times the width of the entire image. If each of the foregoing tests is answered affirmatively, then in step S1105 the block is designated as "combined column". If not, processing proceeds to step S1106.

In step S1106, a three-part test is performed. In the first part, it is determined whether the previous block's left edge is left of the current block's left edge. The second part determines whether the previous block is horizontally separated from the current block, that is, whether there is a non-zero horizontal distance between the right edge of the previous block and the left edge of the current block. The third part determines whether the current block is at least a second child of a horizontal grouping. This last part determines whether the current block is part of a horizontal grouping and is listed at least second in the hierarchical chart behind an element with which it is horizontally grouped, for example, (or is the first block in a grouping that is at least the second child of the horizontal grouping). If the foregoing tests are each answered affirmatively, then in step S1107 block is designated as multiple column. Otherwise, processing proceeds to step S1109.

In step S1109, a three-part test is applied. First, it is determined whether the previous block's top edge is vertically higher than the current block's top edge, that is, whether the y-coordinate of the top edge of the previous block is greater than the y-coordinate of the top edge of the current block. Second, it is determined whether the current block and the next block are vertically separated, that is, whether there is a non-zero vertical distance between the bottom of the previous block and the top of the current block. Third, it is determined whether the current block is included, somewhere up the tree structure, in a horizontal grouping, or whether the current block is vertically grouped with the previous block. If all parts of the foregoing test are answered affirmatively, then in step S1110 the block is designated as "joint column". Otherwise, in step S111 the block is designated as "single column".

The application of the processing steps shown in FIG. 11 to the present example will now be discussed. Specifically, BLK1 is the first block, and therefore in steps S1101 and S1102 is designated as single column.

BLK2 is not the first block, nor is it the first block under its highest-level horizontal grouping, so the test specified in step S1101 fails, and the test specified is step S1104 is applied. In this case, the first part fails because BLK1 is not a non-text image. The test set forth at step S1106 is applied next. Here, the first part of the test also fails because the left edge of the previous block is not to the left of the current block's left edge. Accordingly, the test described in step S1109 is applied next. Here, BLK1's top edge is higher than BLK2's edge, vertical separation exists between the bottom edge of BLK1 and the top edge of BLK2, and BLK2 is vertically grouped with BLK1. Accordingly, the test in S1109 is satisfied and BLK2 is designated as joint column.

The analysis of BLK3 is identical to that of BLK2 and accordingly BLK3 will be designated as joint column also.

BLK4 is not the first block, nor is it the first block under its highest-level horizontal grouping, and BLK3 is not a non-text image. Accordingly, the tests in steps S1101 and S1104 fail, and the test in step S1106 is applied. Here, BLK3's left edge is left of BLK4's left edge, horizontal separation exists between the right edge of BLK3 and the left edge of BLK4, and by reference to the layout data set forth above, it can be seen that BLK4 is the second child of a horizontal grouping. Specifically, BLK4 is horizontally grouped with the vertical group consisting of blocks 1, 2 and 3. Moreover, BLK4 is shown in the layout data as being below that vertical grouping. Accordingly, the test in step S1006 is satisfied, and BLK4 is designated as multiple column.

BLK5 is not the first block, nor is it the first block under its highest-level horizontal grouping, and BLK4 is not a non-text image. Therefore, processing proceeds to step S1106. The left edge of BLK4 is not left of the left edge of BLK5. Accordingly, this test fails. With respect to the test at step S1109, the top edge of BLK4 is higher than the top edge of BLK5 and vertical separation exists between the two blocks. However, BLK5 is not under a horizontal grouping and is not vertically grouped with BLK4. Therefore, this test fails as well. Accordingly, BLK5 is designated as single column.

The analysis of blocks 6 and 7 is the same as that of BLK2, and accordingly, each such block is designated as joint column.

BLK8 is not the first block, but it is the first block of its highest-level horizontal grouping. Therefore, BLK8 is designated as single column.

BLK9 is not the first block, nor is it the first block under its first horizontal grouping. However, in step S1104, the previous block is a non-text image, the previous block's left edge is left of the current block's left edge, the two blocks are horizontally close, and the sum of the widths of the two blocks is less than 0.60 times the width of the entire image. Accordingly, BLK9 is designated combined column.

Similarly, BLK10, BLK12, BLK13 and BLK15 are designated as joint column, since the test in step S1109 is satisfied. BLK11 and BLK14 are designated as multiple column, since the test in step S1106 is satisfied.

Thus, each of the blocks is designated as set forth below:
BLK1: (SINGLECOL)
BLK2: (JOINTCOL)
BLK3: (JOINTCOL)
BLK4: (MULTIPLECOL)
BLK5: (SINGLECOL)
BLK6: (JOINTCOL)
BLK7: (JOINTCOL)
BLK8: (SINGLECOL)
BLK9: (COMBINEDCOL)
BLK10: (JOINTCOL)
BLK11: (MULTIPLECOL)
BLK12: (JOINTCOL)
BLK13: (JOINTCOL)
BLK14: (MULTIPLECOL)
BLK15: (JOINTCOL)

Figure 12:
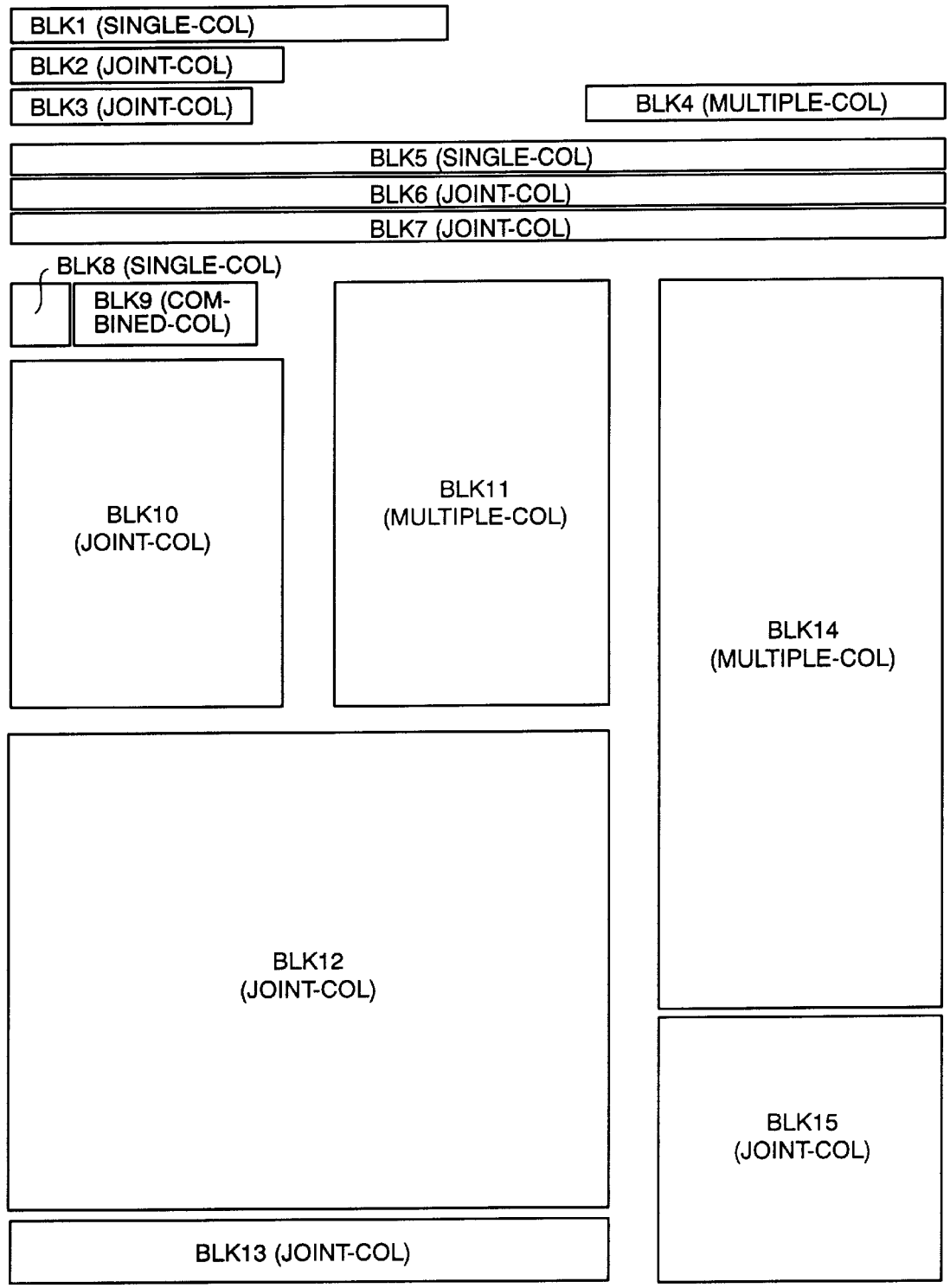

An illustration of these classifications is shown in FIG. 12.

[Determining Column Span and Row Span]

Step S507 will now be discussed in detail. Blocks having column span and row span are located by finding a nested horizontal-vertical-horizontal (parent-child-grandchild) structure that does not include any great-grandchild having been designated combined column in the layout analysis generated in step S505. To facilitate the following discussion, each element in the layout analysis will be referenced in relation to the higher level horizontal grouping in the nested horizontal-vertical-horizontal (parent-child-grandchild) genetic hierarchical structure, using tree structure terminology.

Once a nested horizontal-vertical-horizontal hierarchical structure without a combined column great-grandchild is located, the determination of row span and column span proceeds as follows. The column span number is determined to be the number of children of the horizontal grandchild. The block to which the column span number is assigned is selected to be the first non-horizontal grandchild that has a horizontal sibling, or the first great-grandchild whose parent has a horizontal sibling. The row span number is determined to be the number of horizontal grandchildren plus one. The block to which the row span number is assigned is selected to be the first non-vertical child, or the first grandchild that does not have a horizontal sibling. If a grouping is selected to be assigned the column span number or the row span number, the assignment passes to the first block in that grouping.

The above process is best illustrated by way of example. The structural portion of the layout analysis for the document shown in FIG. 1 is reproduced below, with groupings and blocks numbered (beginning with number 101) for ease of reference.

| 101 | VRT |
| 102 | VRT |
| 103 | HOZ |
| 104 | VRT |
| 105 | BLK1 |
| 106 | BLK2 |
| 107 | BLK3 |
| 108 | BLK4 |
| 109 | VRT |
| 110 | BLK5 |
| 111 | BLK6 |
| 112 | BLK7 |
| 113 | HOZ |
| 114 | VRT |
| 115 | HOZ |
| 116 | VRT |
| 117 | HOZ |
| 118 | BLK8 |
| 119 | BLK9 |
| 120 | BLK10 |
| 121 | BLK11 |
| 122 | VRT |
| 123 | BLK12 |
| 124 | BLK13 |
| 125 | VRT |
| 126 | BLK14 |
| 127 | BLK15 |

Since horizontal-vertical-horizontal (parent-child-grandchild) structure numbers 115–117 has a great-grandchild with a combined column designation (BLK9), the only horizontal-vertical-horizontal structure without a combined column great-grandchild in the layout analysis consists of numbers 113–115. The horizontal grandchild is numbered 115, and its only children are 116 and 121. Therefore, the column span number is two. The grandchildren of horizontal grouping 113 are horizontal grouping 115 and vertical grouping 122. Because BLK12 (123) is the first great-grandchild whose parent (122) has a horizontal sibling (115), BLK12 is assigned the column span number.

With respect to row span, there is only one horizontal grandchild, grouping 115. Therefore, the row span number is equal to two. Because BLK14 (126) is the first grandchild that does not have a horizontal sibling, BLK14 is assigned the row span number.

Consequently, BLK12 is assigned a column span number of 2 and BLK14 is assigned a row span number of 2.

[Block Reordering]

Figure 11B:
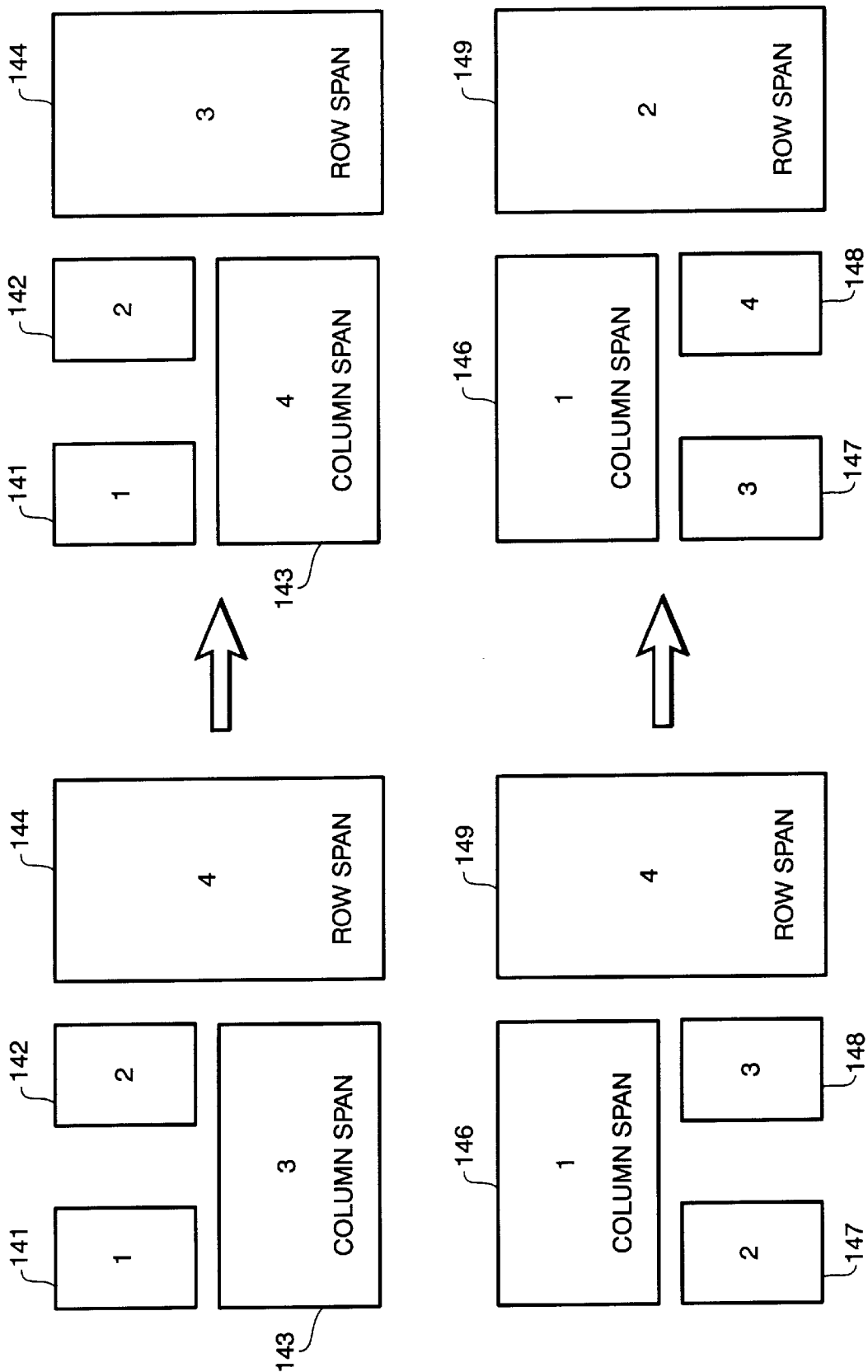
FIG. 11B illustrates two cases where block reordering is required.

Step S509 will now be discussed with reference to FIG. 11B. As shown in FIG. 11B, two general situations might occur in which the block order obtained in step S505 will have to be rearranged to accommodate the way HTML processes table data (i.e., down row by row, in sequence). In each, a row span block is to the right of and horizontally adjacent to a column span block.

Referring to FIG. 11B, the first case exists when blocks are arranged such as blocks 141–144, with the top edge of row span block 144 above the top edge of column span block 143, and step S505 having ordered the group of blocks sequentially as: 141, 142, 143 and 144. In this case, the order of blocks 143 and 144 are switched, resulting in a final order of: 141, 142, 144 and 143.

Similarly, the second case exists when blocks are arranged such as blocks 146–149, with the top edge of row span block 149 above the top edges of blocks 147 and 148, and step S505 having ordered the group of blocks sequentially as: 146, 147, 148 and 149. In this case, the order of block 149 is moved up in position to be placed before block 147, resulting in a final order of: 146, 149, 147 and 148.

The foregoing are merely illustrative of the two generic cases. It should be noted that the number of blocks might vary and the blocks shown might be representative of more than one block. The key elements of this reordering step are: (1) the existence of a row span block to the right of and horizontally adjacent to a column span block, and (2) whether the column span block is on the first or second row that the row span block spans. Moreover, although the foregoing describes the two cases where the row span is two rows, the concept can be easily extended to row spans of more than two.

Applying the foregoing to the present example concerning the document shown in FIG. 1, a row break occurs between BLK10 and BLK12 and then another after BLK12. Accordingly, this presents an example of the first case described above, with BLK10 being the equivalent of block 141, BLK11 being the equivalent of block 142, BLK12 (the column span block) and BLK13 together being the equivalent of block 143, and BLK14 (the row span block) and BLK15 together being the equivalent of block 144. Accordingly, BLK14 and BLK15 are moved up in order before BLK12 and BLK13. The final order is thus: BLK1, BLK2, BLK3, BLK4, BLK5, BLK6, BLK7, BLK8, BLK9, BLK10, BLK11, BLK14, BLK15, BLK12, BLK13.

[HTML Formatting]

Step S510, shown in FIG. 5, will now be discussed in detail with reference to FIGS. 13A through 13D. Generally according to FIG. 13, first an HTML header is inserted. Then for each block, processing is performed in accordance with the block type determined in step S506, a different set of processing steps being assigned to each block type. Finally, after all blocks have been processed, end-of-file codes are inserted.

More particularly, in step S1301 the following HTML header codes are inserted:
"<HTML><HEAD><TITLE>title</TITLE></HEAD><BODY><BODY    GCOLOR= "#FFFFFF"><CENTER>",
where "title" is the title of the file.

In step S1302, the first block is selected.

In step S1304, it is determined whether the block type for the current block is single column. If it is, then single column processing is performed in step S1305 in accordance with steps shown in FIG. 13B, and then processing proceeds to step S1313. If not, processing proceeds to step S1306.

In step 81306, it is determined whether the block type is multiple column. If it is, then multiple column processing is performed in step S1307 in accordance with the steps shown in FIG. 13C, and then processing proceeds to step S1313. If not, processing proceeds to step S1309.

In step S1309, it is determined whether the block type is joint column. If it is, then joint column processing is performed in step S1310 in accordance with the steps shown in FIG. 13D, and then processing proceeds to step S1313. If not, then the block type must be combined column. Because no additional codes are inserted for combined column, processing simply proceeds immediately to step S1313.

In step S1313 the block is inserted into the HTML file. Typically, either the contents of the block are inserted into the HTML file (for text blocks) or a reference to file containing the relevant data (for graphics and bitmap images) is inserted.

In step S1311, it is determined whether the current block is the last block. If it is not, the next block is selected in step S1312 and processing proceeds to step S1304. If the current block is the last block, then in step S1314 the following end-of-file HTML codes are inserted: "</TABLE></CENTER></BODY></HTML>".

Figure 13A:
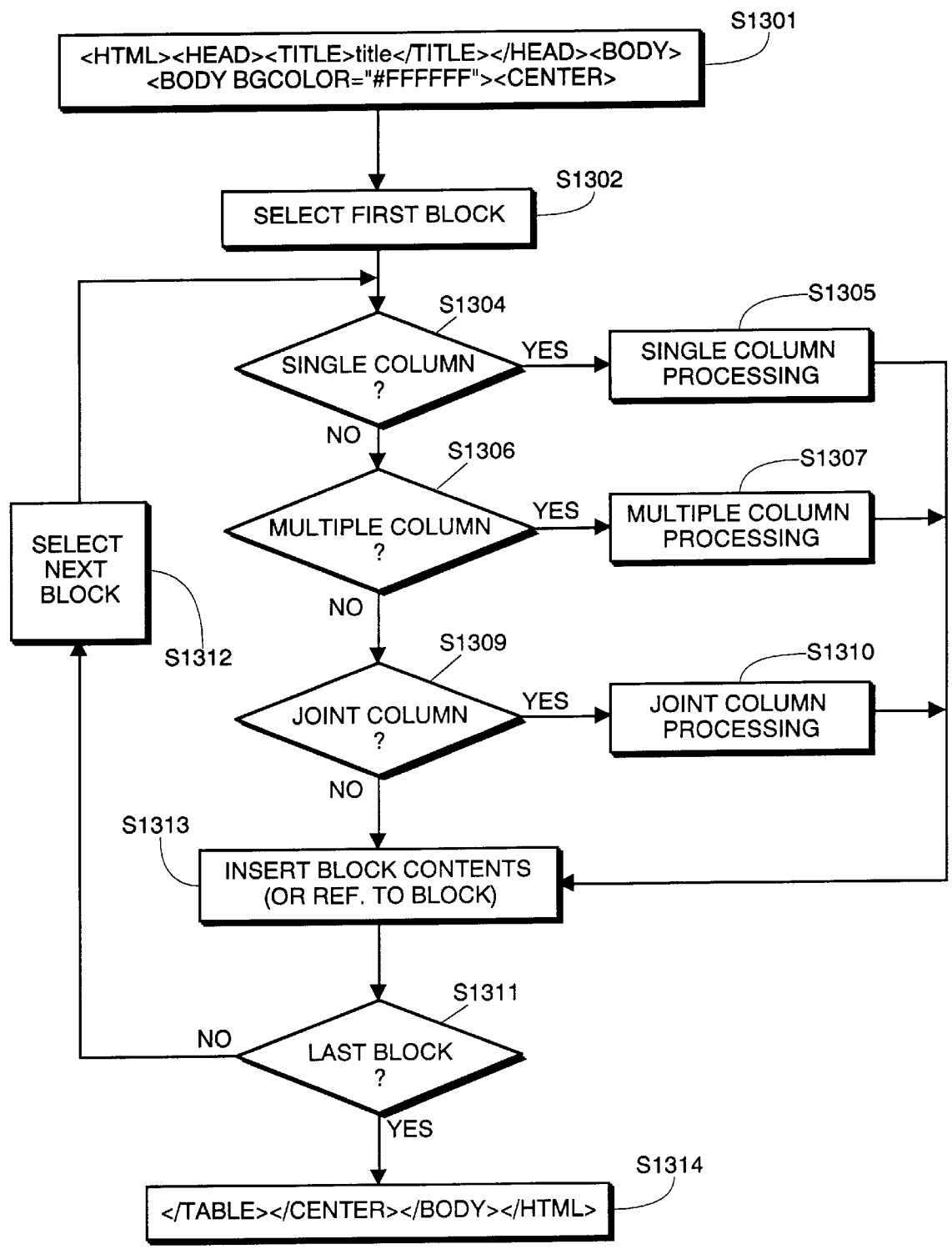
FIGS. 13A–13D are flow diagrams illustrating the generation of HTML instructions for each block in a bitmap image.
Figure 13B:
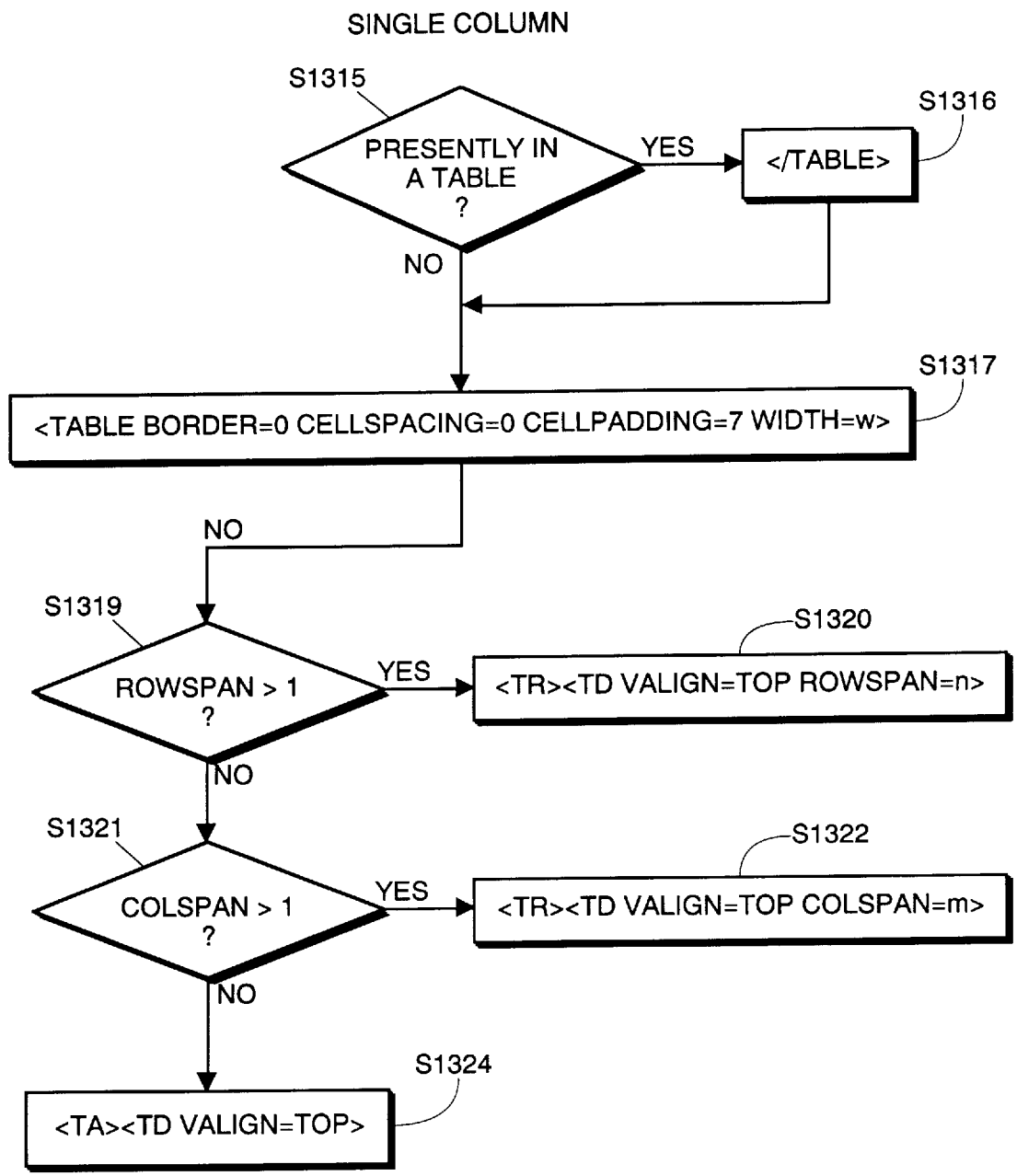

Single column processing of step S1305 will now be discussed in more detail with reference to FIG. 13B. Specifically, in step S1315 it is determined whether the file is currently in a table. If it is, then in step S1316 the end HTML table code ("</TABLE>") is inserted, and processing proceeds to step S1317. Otherwise, processing proceeds to step S1317 without inserting that code.

In step S1317, the following table definition code is inserted into the file: "<TABLE BORDER=0 CELLSPACING=0 CELLPADDING=7 WIDTH=w>", where BORDER, CELLSPACING, CELLPADDING, and WIDTH are attributes of the <TABLE> tag, and where w is equal to the width of the entire image times 72 and divided by the number of dots per inch in the image.

In step S1319, it is determined whether row span for the block (which was determined in step S507) is greater than one. If it is, the following code is inserted into the HTML file:
"<TR><TD VALIGN=TOP ROWSPAN=n>", where n is the row span number determined in step S507. Otherwise, it is determined in step S1321 whether column span is greater than one. If it is, then in step S1322 the following HTML code is inserted into the HTML file: "<TR><TD VALIGN=TOP COLSPAN=m>", where m is the column span number determined in step S507. Otherwise, in step S1324 the following code is inserted into the HTML file: "<TR><TD VALIGN=TOP>".

Figure 13C:
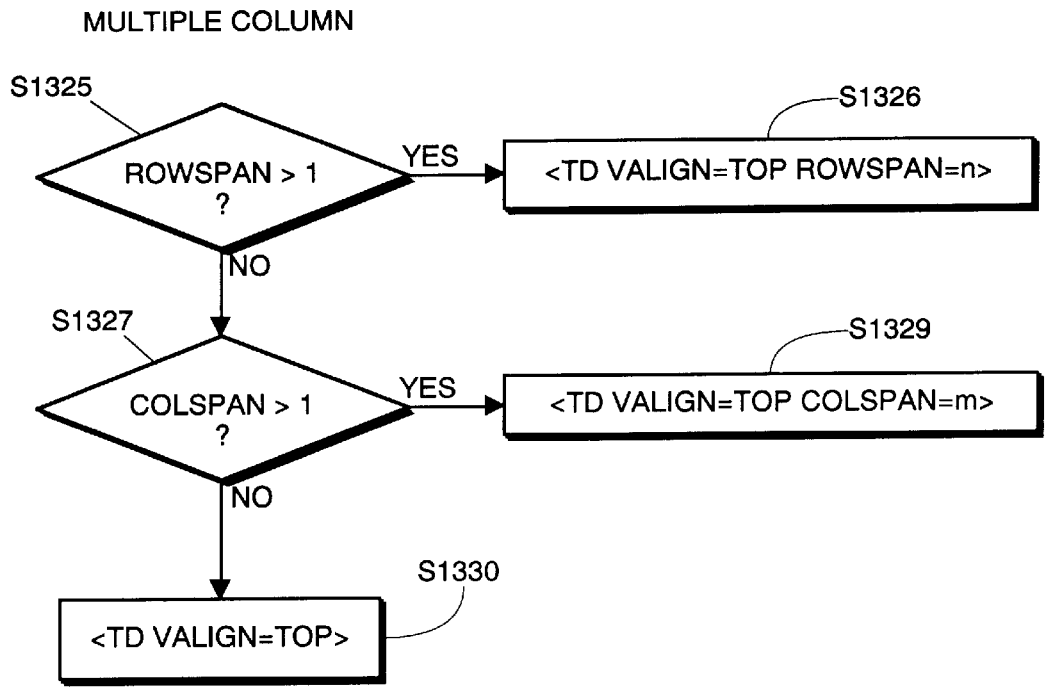

Multiple column processing of step S1307 will now be discussed in more detail with reference to FIG. 13C. Specifically, in step S1325 it is determined whether row span is greater than one. If it is, then the following HTML code is inserted:
"<TD VALIGN=TOP ROWSPAN=n>". Otherwise, in step S1327 it is determined whether column span for the current block is greater than one. If it is, then in step S1329 the following HTML code is inserted into the HTML file: "<TD VALIGN=TOP COLSPAN=m>". Otherwise, in step S1330 the following HTML code is inserted: "<TD VALIGN=TOP>".

Figure 13D:
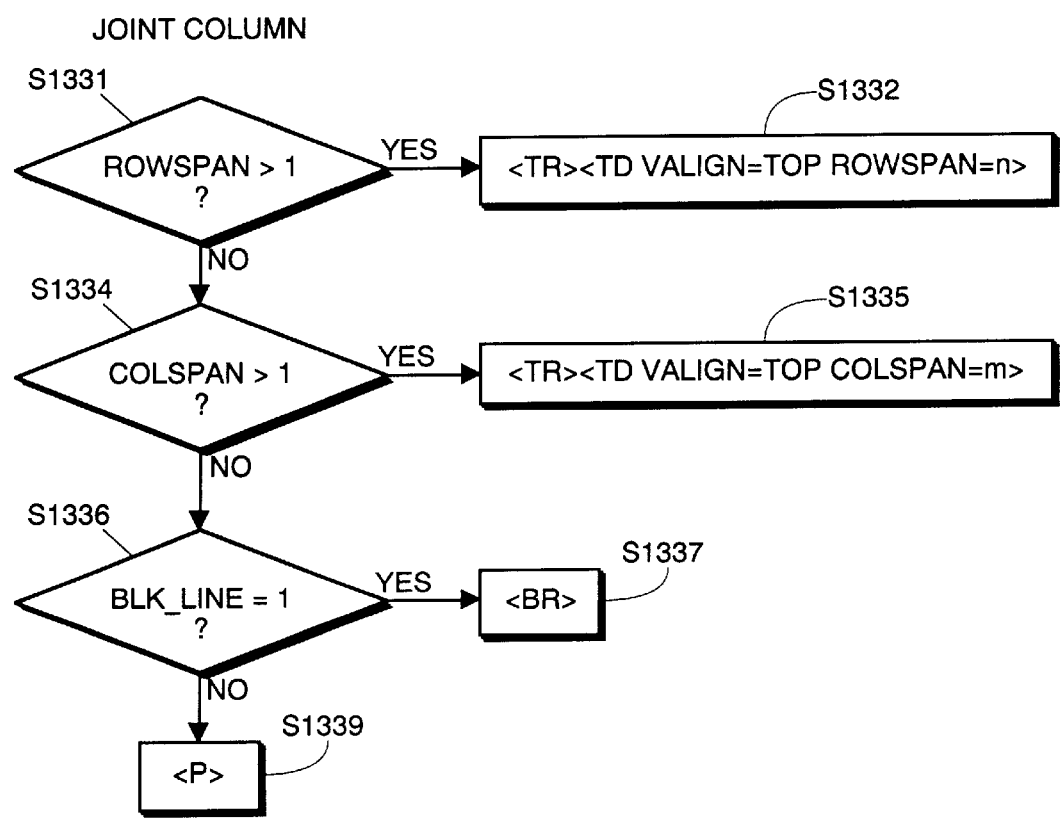

Joint column processing of step S1310 will now be discussed in detail with reference to FIG. 13D. Specifically, in step S1331 it is determined whether the row span of the current block is greater than one. If it is, then in step S1332 the following HTML code is inserted: "<TR><TD VALIGN=TOP ROWSPAN=n>". Otherwise, it is determined in step S1334 whether the column span for the current block is greater than one. If it is, then in step S1335 the following HTML code is inserted:
"<TR><TD VALIGN=TOP COLSPAN=m>". Otherwise, in step S1336 it is determined whether the number of lines in the block (which was determined in step S504 is one. If it is, then in step S1337 the following HTML code is inserted: "<BR>". Otherwise, in step S1339 the following HTML code is inserted: "<P>".

Step S510 is now applied to the present example. First, the HTML header is inserted as shown in step S1301. Next, each of blocks 1 through 15 is consecutively processed to construct the body of the HTML file.

Specifically, BLK1 is single column with no row span or column span. Accordingly, the HTML code is specified in steps S1317 and S1324. Immediately after the insertion of that code, BLK1 (or a reference thereto) is inserted into the HTML file. BLK2 is joint column with no column span or row span and containing one line of text. Accordingly, the <BR> code is inserted and immediately followed by BLK2. BLK3 has the same classification as BLK2 and thus is preceded by the same HTML code. BLK4 is multiple column with no row span or column span. Accordingly, the HTML code is specified by step S1330.

Proceeding in this manner, combined column BLK9 is eventually reached. Accordingly, no HTML code precedes BLK9. Proceeding even further, BLK14, which is multiple column with a row span of 2, is reached. Accordingly, the HTML code is specified by step S1326. Similarly, BLK12 is joint column with a column span of 2. Accordingly, the HTML code is specified by step S1335.

When all blocks have been processed, the end of file codes specified in step S1314 are inserted, and the HTML file is complete. The resulting code is set forth below:

---

<HTML>
<HEAD>
<TITLE>Earth1</TITLE>
</HEAD>
<BODY BGCOLOR = "#FFFFFF">
<CENTER>
<TABLE BORDER = 0 CELLSPACING = 0 CELLPADDING = 7 WIDTH = 738>
<TR><TD VALIGN =         TOP> BLK1
                         <BR> BLK2
                         <BR> BLK3
<TD VALIGN =             TOP> BLK4
</TABLE>
<TABLE BORDER = 0 CELLSPACING = 0 CELLPADDING = 7 WIDTH = 738>
<TR><TD VALIGN =         TOP> BLK5
                         <BR> BLK6
                         <BR> BLK7
</TABLE>
<TABLE BORDER = 0 CELLSPACING = 0 CELLPADDING = 7 WIDTH = 738>
<TR><TD VALIGN =         TOP> BLK8
                              BLK9
                         <P> BLK10
<TD VALIGN =             TOP> BLK11
<TD VALIGN =             TOP ROWSPAN = 2> BLK14
                         <P> BLK15
<TR><TD VALIGN =         TOP COLSPAN = 2> BLK12
                         <P> BK13
</TABLE>
</CENTER>
</BODY>
</HTML>

---

FIG. 14 illustrates the appearance of a Web page generated in accordance with the above HTML code. As can be seen from FIG. 14, title 201 is properly placed in the upper-left corner, and article type 202 is placed very close to the upper-right corner. Columns 204, 205 and 206 have been retained and appear very similar to the layout of the original document. Also, footer 209 is in the lower-right corner and picture 207 is in the lower-left corner underneath columns 204 and 205 and to the left of column 206.

Thus, the HTML file generated can be used to generate a page which closely follows the layout presented in the original document.

The invention has been described with respect to particular illustrative embodiments. It is to be understood that the invention is not limited to the above described embodiments and modifications thereto, and that various changes and modifications may be made by those of ordinary skill in the art without departing from the spirit and scope of the appended claims.

What is claimed is:

1. A method for generating a hypertext markup language (HTML) file based on a bitmap image, comprising:

obtaining at least two horizontally adjacent image blocks in separate vertical columns of the bitmap image, including an image block for plural character images and an image block for a bitmap image;

generating an image file which stores the bitmap image; and automatically generating, from the image blocks, an HTML file in which blocks corresponding to the two horizontally adjacent image blocks obtained from the bitmap image are tagged as data elements in a row of an HTML tagged table, wherein the block in the HTML file corresponding to the image block for the bitmap image includes an HTML link to the generated image file.

2. A method according to claim 1, wherein an HTML code is assigned to each block in accordance with a position of the block relative to other elements within the bitmap image.

3. A method according to claim 1, wherein table tags are generated and inserted into the HTML file in said generating step.

4. A method according to claim 1, further comprising the step of character-recognizing the character images in the image block for plural character images, so as to obtain character codes for such character images, wherein the block in the HTML file corresponding to the image block for the plural character images includes the character codes for the character images.

5. A method for generating a hypertext markup language (HTML) file based on a bitmap image, comprising:

a segmenting step of segmenting the bitmap image to obtain image blocks, including an image block for plural character images and an image block for a bitmap image;

a determining step of determining where in the bitmap image each of the image blocks is located;

an identifying step of identifying positional relationships between the image blocks based on thier relative locations;

a first generating step of generating an image file which stores the bitmap image; and a second step of automatically generating an HTML file in which blocks corresponding to the image blocks obtained from the bitmap image are tagged as being data elements in an HTML tagged table, the tags being determined in accordance with the identified positional relationships, wherein the block in the HTML file corresponding to the image block for the bitmap image includes an HTML link to the generated image file.

6. A method according to claim 5, wherein the identifying step includes forming vertical and horizontal groupings of the blocks.

7. A method according to claim 5, wherein the identifying step includes forming a hierarchical structure.

8. A method according to claim 7, wherein the step of forming the hierarchical structure includes forming horizontal and vertical groupings of elements, the elements consisting of previously formed groupings and ungrouped blocks.

9. A method according to claim 8, wherein horizontal and vertical groupings are formed by testing two elements at a time, a new grouping being formed when a rectangle can be formed which encloses the two tested elements and no other elements.

10. A method according to claim 9, wherein the step of forming vertical and horizontal groupings includes alternating between forming all possible vertical groupings and forming all possible horizontal groupings.

11. A method according to claim 9, wherein two identified elements are tested for vertical grouping only if the two identified elements are not horizontally adjacent to each other.

12. A method according to claim 9, wherein two identified elements are tested for horizontal grouping only if the two identified elements are not vertically adjacent to each other.

13. A method according to claim 8, wherein the identifying step includes ordering the blocks based on a sequence in which the vertical and horizontal groupings are formed.

14. A method according to claim 5, wherein the identifying step includes a step of ordering the blocks based on the identified positional relationships.

15. A method according to claim 5, wherein table tags are generated and inserted into the HTML file in said generating step.

16. A method according to claim 5, further comprising the step of character-recognizing the character images in the image block for plural character images, so as to obtain character codes for such character images, wherein the block in the HTML file corresponding to the image block for the plural character images includes the character codes for the character images.

17. A method for generating a hypertext markup language (HTML) file based on bitmap image data, comprising the steps of:

segmenting the bitmap image into image blocks, including an image block for plural character images and an image block for a bitmap image;

analyzing layout relationships between the image blocks based on the relative locations of the image blocks in the bitmap image;

a block-type determination step of determining block type of each image block based on the layout relationships obtained in said analyzing step;

a span determination step of determining column span and row span information for each image block that spans more than one column and/or row;

a first generating step of generating an image file which stores the bitmap image; and a second generating step of automatically generating an HTML file in which blocks corresponding to the image blocks obtained from the bitmap image are tagged as being data elements in an HTML tagged table, the tags being determined based on the block type obtained in said block-type determination step and based on the column span and row span information obtained in said span determination step, wherein the block in the RTML file corresponding to the image block for the bitmap image includes an HTML link to the generated image tile.

18. A method according to claim 17, wherein said analyzing step includes iterative steps of combining blocks into vertical and horizontal groupings.

19. A method according to claim 17, wherein said block-type determination step includes the step of assigning to each block a type selected from the group consisting of: a single block, a combined block, a joint block, and a multiple block.

20. A method according to claim 19, wherein said step of assigning is based on proximity of each block to adjacent blocks and also based on layout information obtained is said analyzing step.

21. A method according to claim 17, wherein analyzing step groups blocks into vertical and horizontal groupings, and wherein said span determination step includes the step of determining column span and row span by counting the number of blocks within vertical groupings and the number of blocks within horizontal groupings.

22. A method according to claim 17, further comprising the step of character-recognizing the character images in the image block for plural character images, so as to obtain character codes for such character images, wherein the block in the HTML file corresponding to the image block for the plural character images includes the character codes for the character images.

23. An apparatus for generating a hypertext markup language (HTML) file based on a bitmap image, comprising:
 a memory which stores process steps that are executable by a processor; and
 a processor which executes the process steps stored in the memory to (1) obtain at lest two horizontally adjacent image blocks in separate vertical columns of the bitmap image, including an image block for plural character images and an image block for a bitmap image, (2) generate an image file which stores the bitmap image, and (3) automatically generate an HTML file in which blocks corresponding to the two horizontally adjacent image blocks obtained by the obtaining means are tagged as data elements in a row of an HTML tagged table, wherein the block in the HTML file corresponding to the image block for the bitmap image includes an HTML link to the generated image file.

24. An apparatus according to claim 23, wherein the processor assigns an HTML code to each block in accordance with a position of the block relative to other elements within the bitmap image.

25. An apparatus according to claim 23, wherein table tags are generated and inserted into the HTML file by said processor.

26. An apparatus according to claim 23, further comprising character recognition means for character-recognizing the character images in the image block for plural character images, so as to obtain character codes for such character images, wherein the block in the HTML file corresponding to the image block for the plural character images includes the character codes for the character images.

27. An apparatus for generating a hypertext markup language (HTML) file based on a bitmap image, comprising:
 a memory which stores process steps that are executable by a processor; and
 a processor which executes the process steps stored in the memory (1) to segment the bitmap image to obtain image blocks, including an image block for plural character images and an image block for a bitmap image, (2) to determine where in the bitmap image each of the image blocks is located, (3) to identify positional relationships between the image blocks based on their relative locations, (4) to generate an image file which stores the bitmap image, and (5) to automatically generate an HTML file in which blocks corresponding to the image blocks obtained from the bitmap image are tagged as being data elements in an RTML tagged table, the tags being determined in accordance with the identified positional relationships, wherein the block in the HTML file corresponding to the image block for the bitmap image includes an HTML link to the generated image file.

28. An apparatus according to claim 27, wherein when the processor identifies positional relationships between the blocks, the processor forms vertical and horizontal groupings of the blocks.

29. An apparatus according to claim 27, wherein when the processor identifies positional relationships between the blocks, the processor forms a hierarchical structure.

30. An apparatus according to claim 29, wherein the processor forms the hierarchical structure by forming horizontal and vertical groupings of elements, the elements consisting of previously formed groupings and ungrouped blocks.

31. An apparatus according to claim 30, wherein the processor forms the horizontal and vertical groupings by testing two elements at a time, a new grouping being formed when a rectangle can be formed which encloses the two tested elements and no other elements.

32. An apparatus according to claim 31, wherein the processor forms the vertical and horizontal groupings by alternating between forming all possible vertical groupings and forming all possible horizontal groupings.

33. An apparatus according to claim 31, wherein the processor tests two identified elements for vertical grouping only if the two identified elements are not horizontally adjacent to each other.

34. An apparatus according to claim 31, wherein the processor tests two identified elements for horizontal grouping only if the two identified elements are not vertically adjacent to each other.

35. An apparatus according to claim 30, wherein the processor identifies the positional relationships between the blocks by ordering the blocks based on a sequence in which the vertical and horizontal groupings are formed.

36. An apparatus according to claim 27, wherein the processor identifies the positional relationships between the blocks by ordering the blocks based on the identified positional relationships.

37. An apparatus according to claim 27, wherein table tags are generated and inserted into the HTML file by said processor.

38. An apparatus according to claim 27, further comprising character recognition means for character-recognizing the character images in the image block for plural character images, so as to obtain character codes for such character images, wherein the block in the HTML file corresponding to the image block for the plural character images includes the character codes for the character images.

39. An apparatus for generating a hypertext markup language (HTML) file based on bitmap image data, comprising:
 a memory for storing the bitmap image data and process steps executable by a processor; and
 a processor which executes the process steps stored in the memory (1) to segment the bitmap image into image blocks, including an image block for plural character images and an image block for a bitmap image, (2) to analyze layout relationships between the image blocks based on the relative locations of the image blocks in the bitmap image, (3) to determine a block type of each image block based on the layout relationships obtained by the processor, (4) to determine column span and row span information for each image block that spans more than one column and/or row, (5) to generate an image file which stores the bitmap image; and (6) to automatically generate an HTML file in which blocks corresponding to the image blocks obtained from the bitmap image are tagged as being data elements in an HTML tagged table, the tags being determined based on the block type determined by the processor and the column span and row span information determined by the processor, wherein the block in the HTML file corresponding to the image block for the bitmap image includes an HTML link to the generated image file.

40. An apparatus according to claim 39, wherein the processor analyzes layout relationships between the blocks by combining the blocks into vertical and horizontal groupings.

41. An apparatus according to claim 39, wherein the processor determines a block type of each block by assigning to each block a type selected from the group consisting of: a single block, a combined block, a joint block, and a multiple block.

42. An apparatus according to claim 41, wherein the processor assigns a block type to each block based on proximity of each block to adjacent blocks and also based on layout information obtained by the processor.

43. An apparatus according to claim 39, wherein the layout relationship analysis step executed by the processor includes grouping the blocks into vertical and horizontal groupings, and wherein the processor determines column span and row span information for each block by counting the number of blocks within vertical groupings and the number of blocks within horizontal groupings.

44. An apparatus according to claim 39, further comprising character recognition means for character-recognizing the character images in the image block for plural character images, so as to obtain character codes for such character images, wherein the block in the HTML file corresponding to the image block for the plural character images includes the character codes for the character images.

45. Computer-executable process steps stored on a computer-readable medium, the computer executable process steps to generate a hypertext markup language (HTML) file based on a bitmap image, the process steps comprising:

an obtaining step to obtain at least two horizontally adjacent image blocks in separate vertical columns of the bitmap image, including an image block for plural characters and an image block for a bitmap image;

a generating step to generate an image file which stores the bitmap image; and an automatic generating step to automatically generate an HTML file in which blocks corresponding to the two horizontally adjacent image blocks obtained from the bitmap image are tagged as data elements in a row of an HTML tagged table, wherein the block in the HTML file corresponding to the image block for the bitmap image includes an HTML link to the generated image file.

46. Computer-executable process steps according to claim 45, wherein an HTML code is assigned to each block in accordance with a position of the block relative to other elements within the bitmap image.

47. Computer-executable process steps according to claim 45, wherein table tags are generated and inserted into the HTML file in said generating step.

48. Computer-executable process steps according to claim 45, further comprising a process step to character-recognize the character images in the image block for plural character images, so as to obtain character codes for such character images, wherein the block in the HTML file corresponding to the image block for the plural character images includes the character codes for the character images.

49. Computer-executable process steps stored on a computer-readable medium, the computer executable process steps to generate a hypertext markup language (HTML) file based on a bitmap image, the computer-executable process steps comprising:

a segmenting step to segment the bitmap image to obtain image blocks, including an image block for plural character images and an image block for a bitmap image;

a determining step to determining where in the bitmap image each of the image blocks is located;

an identifying step to identify positional relationships between the image blocks based on their relative locations;

a first generating step to generate an image file which stores the bitmap image; and a second generating step to automatically generate an HTML file in which blocks corresponding to the image blocks obtained from the bitmap image are tagged as being data elements in an HTML tagged table, the tags being determined in accordance with the identified positional relationships, wherein the block in the HTML file corresponding to the image block for the bitmap image includes an HTML link to the generated image file.

50. Computer-executable process steps according to claim 49, wherein the identifying step includes forming vertical and horizontal groupings of the blocks.

51. Computer-executable process steps according to claim 49, wherein the identifying step includes forming a hierarchical structure.

52. Computer-executable process steps according to claim 51, wherein the step of forming the hierarchical structure includes forming horizontal and vertical groupings of elements, the elements consisting of previously formed groupings and ungrouped blocks.

53. Computer-executable process steps according to claim 52, wherein horizontal and vertical groupings are formed by testing two elements at a time, a new grouping being formed when a rectangle can be formed which encloses the two tested elements and no other elements.

54. Computer-executable process steps according to claim 53, wherein the step of forming vertical and horizontal groupings includes alternating between forming all possible vertical groupings and forming all possible horizontal groupings.

55. Computer-executable process steps according to claim 53, wherein two identified elements are tested for vertical grouping only if the two identified elements are not horizontally adjacent to each other.

56. Computer-executable process steps according to claim 53, wherein two identified elements are tested for horizontal grouping only if the two identified elements are not vertically adjacent to each other.

57. Computer-executable process steps according to claim 52, wherein the identifying step includes ordering the blocks based on a sequence in which the vertical and horizontal groupings are formed.

58. Computer-executable process steps according to claim 49, wherein the identifying step includes a step to order the blocks based on the identified positional relationships.

59. Computer-executable process steps according to claim 49, wherein table tags are generated and inserted into the HTML file in said generating step.

60. Computer-executable process steps according to claim 49, further comprising a process step to character-recognize the character images in the image block for plural character images, so as to obtain character codes for such character images, wherein the block in the HTML file corresponding to the image block for the plural character images includes the character codes for the character images.

61. Computer-executable process steps stored on a computer-readable medium, the computer executable process steps to generate a hypertext markup language (HTML) file based on bitmap image data, the computer-executable process steps comprising:

a segmenting step to segment the bitmap image into image blocks, including an image block for plural character images and an image block for a bitmap image;

an analyzing step to analyze layout relationships between the image blocks based on the relative locations of the image-blocks in the bitmap image;

a block-type determination step to determine a block type of each image block based on the layout relationships obtained in said analyzing step;

a span determination step to determine column span and row span information for each image block that spans more than one column and/or row;

a first generating step to generate an image file which stores the bitmap image; and a second generating step to automatically generate an HTML file in which blocks corresponding to the image blocks obtained from the bitmap image are tagged as being data elements in an HTML tagged table, the tags being determined based on the block type obtained in said block-type determination step and based on the column span and row span information obtained in said span determination step, wherein the block in the HTML file corresponding to the image block for the bitmap image includes an HTML link to the generated image file.

62. Computer-executable process steps according to claim 61, wherein said analyzing step includes iterative steps to combine blocks into vertical and horizontal groupings.

63. Computer-executable process steps according to claim 61, wherein said block-type determination step includes a step to assign to each block a type selected from the group consisting of: a single block, a combined block, a joint block, and a multiple block.

64. Computer-executable process steps according to claim 63, wherein said step of assigning is based on proximity of each block to adjacent blocks-and also based on layout information obtained is said analyzing step.

65. Computer-executable process steps according to claim 61, wherein analyzing step groups blocks into vertical and horizontal groupings, and wherein said span determination step includes a step to determine column span and row span by counting the number of blocks within vertical groupings and the number of blocks within horizontal groupings.

66. Computer-executable process steps according to claim 61, further comprising a process step to character-recognize the character images in the image block for plural character images, so as to obtain character codes for such character images, wherein the block in the HTML file corresponding to the image block for the plural character images includes the character codes for the character images.

* * * * *

UNITED STATES PATENT AND TRADEMARK OFFICE
CERTIFICATE OF CORRECTION

PATENT NO. : 5,893,127

DATED : April 6, 1999

INVENTORS : Ching-Yu Tyan, Hung Khei Huang, and Toru Niki

Page 1 of 4

It is certified that error appears in the above-identified patent and that said Letters Patent is hereby corrected as shown below:

ON THE COVER PAGE

Under [56], References Cited, U.S. Patent Documents, insert --
    5,091,964    2/1992    Shimomura . . . 882/9--

Under [56], References Cited, Other Publications, change "Window Magazine" to "Windows Magazine".

Under [56], References Cited, Other Publications, change "Lawrentini" to --Laurentini--.

Under [56], References Cited, Other Publications, in Okamoto et al., change "746" to --748--.

Under [56], References Cited, Other Publications, change "hierarchical" to --Hierarchical-- and change "block" to --Block--.

Under [56], References Cited, Other Publications, in D.J. Ittner, change "Proccedings" to --Proceedings--.

Column 1

Line 56, change "(/)" to --(/).--

UNITED STATES PATENT AND TRADEMARK OFFICE
CERTIFICATE OF CORRECTION

PATENT NO. : 5,893,127

DATED : April 6, 1999

INVENTORS : Ching-Yu Tyan, Hung Khei Huang, and Toru Niki

Page 2 of 4

It is certified that error appears in the above-identified patent and that said Letters Patent is hereby corrected as shown below:

COLUMN 4

Line 40, change "relationships.between" to --relationships between--

COLUMN 6

Line 38, change "JPEG" to --.JPEG--.

COLUMN 7

Line 10, change "english" to --English--.

COLUMN 14

Line 53, change "81306" to --S1306--.

COLUMN 16

Line 43, change "BK13" to --BLK13--.

UNITED STATES PATENT AND TRADEMARK OFFICE
CERTIFICATE OF CORRECTION

PATENT NO. : 5,893,127

DATED : April 6, 1999

INVENTORS : Ching-Yu Tyan, Hung Khei Huang, and Toru Niki

It is certified that error appears in the above-identified patent and that said Letters Patent is hereby corrected as shown below:

COLUMN 17

Line 44, after "second" insert --generating--.

COLUMN 18

Line 53, change "RTML" to --HTML--; and

Line 51, change "tile" to --file--.

COLUMN 19

Line 16, change "lest" to --least--; and

Line 58, change "RTML" to --HTML--.

COLUMN 22

Line 1, change determining" to --determine--.

UNITED STATES PATENT AND TRADEMARK OFFICE
CERTIFICATE OF CORRECTION

PATENT NO. : 5,893,127

DATED : April 6, 1999

INVENTORS : Ching-Yu Tyan, Hung Khei Huang, and Toru Niki

It is certified that error appears in the above-identified patent and that said Letters Patent is hereby corrected as shown below:

COLUMN 24

Line 11, change "blocks-and" to --blocks and--; and

Line 12, change "is" to --in--.

Signed and Sealed this

Seventh Day of March, 2000

Attest:

Attesting Officer

Q. TODD DICKINSON

Commissioner of Patents and Trademarks